(12) United States Patent
Albright et al.

(10) Patent No.: US 7,502,655 B2
(45) Date of Patent: Mar. 10, 2009

(54) METHODS FOR PROVIDING OPTIMAL LIGHT-CO2 COMBINATIONS FOR PLANT PRODUCTION

(75) Inventors: Louis D. Albright, Ithaca, NY (US); Konstantinos Ferentinos, Athens (GR); Ido Seginer, Haifa (IL); David S. de Villiers, Willseyville, NY (US); Jeffrey W. Ho, Scottsdale, AZ (US)

(73) Assignee: Cornell Research Foundation, Inc., Ithaca, NY (US)

( * ) Notice: Subject to any disclaimer, the term of this patent is extended or adjusted under 35 U.S.C. 154(b) by 0 days.

(21) Appl. No.: 11/668,030

(22) Filed: Jan. 29, 2007

(65) Prior Publication Data

US 2007/0124003 A1 May 31, 2007

Related U.S. Application Data

(62) Division of application No. 10/976,958, filed on Oct. 29, 2004, now Pat. No. 7,184,846.

(60) Provisional application No. 60/516,194, filed on Oct. 31, 2003.

(51) Int. Cl.
*G05B 13/02* (2006.01)
*G05B 11/01* (2006.01)
*G06F 19/00* (2006.01)
*G05D 11/00* (2006.01)
*A01B 41/00* (2006.01)
*A01G 9/00* (2006.01)
*G01V 3/00* (2006.01)
*G01V 7/00* (2006.01)
*E02B 13/00* (2006.01)

(52) U.S. Cl. .......................... 700/36; 700/11; 700/110; 700/284; 700/286; 702/2; 405/37; 47/1.43; 47/17; 47/58.1 R

(58) Field of Classification Search ................ 700/286, 700/110, 284, 11; 47/1.43, 17, 58.1 R; 405/37; 702/2

See application file for complete search history.

(56) References Cited

U.S. PATENT DOCUMENTS 4,015,366 A * 4/1977 Hall, III ....................... 47/1.43

(Continued)

OTHER PUBLICATIONS

Ferentinos et al ("optimal light integral and carbon dioxide concentration combinations for lettuce in ventilated grenhouses", J. agric. Engng Res., 2000, 77(3), pp. 309-315).*

(Continued)

*Primary Examiner*—Albert DeCady
*Assistant Examiner*—Sunray R Chang
(74) *Attorney, Agent, or Firm*—Burns & Levinson LLP; Jacob N. Erlich; Kathleen Chapman

(57) ABSTRACT

Method for optimizing plant production in a cost effective manner. System (100) includes a processor (102) in communication with resource controllers (110, 112) for controlling resources (106, 108) such as, for example, lighting and carbon dioxide. Each resource has a cost that varies temporally or with other factors. The processor implements an algorithm that receives a desired plant production rate and other input, such as operating conditions of the system and environment, and determines amounts of each resource to expend consistent with plant production goals and resource costs.

20 Claims, 12 Drawing Sheets

U.S. PATENT DOCUMENTS

| | | | | |
|---|---|---|---|---|
| 4,163,342 | A * | 8/1979 | Fogg et al. | 47/58.1 R |
| RE31,023 | E * | 9/1982 | Hall, III | 405/37 |
| 4,396,872 | A | 8/1983 | Nutter | 315/308 |
| 4,430,828 | A | 2/1984 | Oglevee et al. | 47/17 |
| 4,470,405 | A | 9/1984 | Landstrom et al. | 126/428 |
| 4,527,247 | A | 7/1985 | Kaiser et al. | 364/550 |
| 4,569,150 | A * | 2/1986 | Carlson et al. | 47/17 |
| 4,817,332 | A * | 4/1989 | Ikeda et al. | 47/17 |
| 4,930,446 | A | 6/1990 | Huisinga | 119/21 |
| 4,992,942 | A | 2/1991 | Bauerle et al. | 364/420 |
| 5,001,859 | A | 3/1991 | Sprung | 47/17 |
| 5,014,225 | A | 5/1991 | Vidaver et al. | 364/550 |
| 5,031,358 | A | 7/1991 | Sussman | 47/58 |
| 5,040,329 | A | 8/1991 | Michaloski | 47/65 |
| 5,130,925 | A * | 7/1992 | Janes et al. | 702/2 |
| 5,174,793 | A | 12/1992 | Ikeda et al. | 47/58 |
| 5,269,093 | A | 12/1993 | Horaguchi et al. | 47/1.01 |
| 5,323,567 | A | 6/1994 | Nakayama et al. | 47/65 |
| 5,573,179 | A | 11/1996 | Timmons et al. | 236/6 |
| 5,771,634 | A * | 6/1998 | Fudger | 47/62 N |
| 5,818,734 | A * | 10/1998 | Albright | 700/306 |
| 5,870,302 | A * | 2/1999 | Oliver | 700/11 |
| 5,946,852 | A | 9/1999 | Oram et al. | 47/58.1 |
| 6,212,823 | B1 | 4/2001 | Oram et al. | 47/17 |
| 6,446,385 | B1 * | 9/2002 | Crutcher | 47/17 |
| 6,583,573 | B2 | 6/2003 | Bierman | 315/149 |
| 6,705,043 | B1 * | 3/2004 | Opdam et al. | 47/17 |
| 6,725,598 | B2 | 4/2004 | Yoneda et al. | 47/60 |
| 6,847,854 | B2 | 1/2005 | Discenzo | 700/99 |
| 7,050,873 | B1 | 5/2006 | Discenzo | 700/99 |
| 2004/0045049 | A1 | 3/2004 | Zhang et al. | 800/278 |

OTHER PUBLICATIONS

H. Challa ("second international symposium on models for plant growth, environmental control and farm management in protected cultivation", Wageningen, The Netherlands, 1997, pp. 45-51+ 2 cover pages).*

Phelan et al, ("Pseudo-Derivative Feedback Control", 1977, 3 pages).*

Tremblay et al ("effect of carbon dioxide enrichment and light", HortTechnology, 1998, 5 pages).*

* cited by examiner

METHODS FOR PROVIDING OPTIMAL LIGHT-CO2 COMBINATIONS FOR PLANT PRODUCTION

CROSS-REFERENCE TO RELATED APPLICATIONS

This application is a divisional of U.S. patent application Ser. No. 10/976,958 entitled "Systems and Methods for Providing Optimal Light-$CO_2$ Combinations for Plant Production," filed Oct. 29, 2004, which in turn claims the benefit of priority of U.S. Provisional Patent Application Ser. No. 60/516,194 entitled "Systems and Methods for Providing Optimal Light-$CO_2$ Combinations for Plant Production," filed Oct. 31, 2003, the contents of both of which applications are incorporated herein by reference in their entirety.

FIELD OF THE INVENTION

The present invention relates generally to plant production systems and more particularly to controlling resources related to plant production

BACKGROUND OF THE INVENTION

In order for plants to grow, they need various resources. For example, plants require light as part of their photosynthesis process. Plant production may be enhanced by addition of supplemental lighting, but this comes at a cost. Similarly, plant production may be enhanced by the addition of supplemental $CO_2$, but this too comes at a cost.

Research has demonstrated that light and $CO_2$ resources can be combined in combinations that optimize plant growth. Examples of such published research are: Both A J, Albright L D, Langhans R W. 1997. Coordinated management of daily PAR integral and carbon dioxide for hydroponic lettuce production. *Acta Horticulturae* 456:45-51; and Ferentinos K P, Albright L D, Ramani D V. 2000. Optimal light integral and carbon dioxide concentration combinations for lettuce in ventilated greenhouses. *J Agric Engng Res*, 77(3):309-315. The contents of each reference are incorporated herein by reference in their entirety as a basis for understanding the present invention. Practical application to actual cost efficient greenhouse operation, however, has been lacking, and many greenhouse environmental controllers do not take into account how the plants respond to the environmental conditions over time.

The endless quest of greenhouse operators is to produce the best crops possible at the lowest practical costs. This is an optimization problem in which benefits of a mix of inputs must be balanced against their combined costs. Extant approaches to greenhouse operation have not provided temporally sensitive control strategies to provide optimal combinations of resources in view of varying cost structures associated with at least one of the plant growth resources. As a result, there is a need in the art for control methods and systems that perform such optimizations.

It is known that increasing aerial $CO_2$ concentration (within limits) improves photosynthetic efficiencies of C3 plants. Greenhouse plant production in regions of the world with cloudy climates can benefit from supplemental lighting, particularly during the winter season. Supplemental fighting is typically expensive to operate, whereas $CO_2$ resources are generally inexpensive. However, air infiltration and ventilation are $CO_2$ loss paths potentially making supplemental $CO_2$ more costly than electricity for supplemental lighting in order to achieve comparable growth. Moreover, it is not clear whether the $CO_2$ concentration must remain fixed through time for optimum control and minimum cost. Whether it is cost effective to add $CO_2$, or operate supplemental lighting, and deciding the optimum combination of $CO_2$ concentration and the light integral for the next decision period are important questions that must be answered to implement optimized computer control. Numerous models have been proposed (e.g., Ferentinos. et al., 2000) that explore optimized combinations of the daily light integral and $CO_2$, but generally are not configured for real-time control purposes.

Careful control of the daily growth rate becomes possible when light and $CO_2$ are controlled within tight limits (see Albright, et al. 2000. Controlling greenhouse light to a consistent daily integral. Trans. of the ASAE 43(2):421-431; and see also Both, et al. 2000. Coordinated management of daily PAR integral and carbon dioxide for hydroponic lettuce production. Acta Horticulturae No. 456:45-52; the contents of each reference are incorporated herein by reference.) Coordinated management of the two can substantially increase yields and lower production costs beyond levels achievable with practices based on adding supplemental light only, supplementing $CO_2$ only, supplementing each independently, or simply accepting what the Sun provides.

Thus, a need exists to make cost optimized plant production realizable, particularly through approaches that involve calculating at regular intervals recommended combinations of plant growth resources, such as $CO_2$ concentrations and supplemental lighting, and that translate cost and growth optimized resource combinations into greenhouse resources controller actions.

SUMMARY OF THE INVENTION

The present invention provides optimum control of multiple resources involved in plant production.

In a first aspect, the present invention provides computerized control systems including a processor and resource controllers that control plant growth by adjusting the amounts of plant growth resources provided to a plant. The cost of each resource is taken into account during calculations performed by the processor to achieve a desired plant production rate. The cost of each resource may vary based upon the time period during which the resource is to be added. The presence of the resources (e g., lighting or carbon dioxide) may be monitored and provided to the processor for the purpose of periodically performing determinations of the appropriate amounts of the resources to be expended to achieve the desired plant production rate in an optimally cost-effective manner. The resource controllers may then cause the calculated amounts of resource to be physically implemented.

In another aspect, the present invention provides methods of controlling resources for growing a plant that are preferably, but not exclusively, implemented in a computerized environment. The method involves receiving a desired plant production rate related to a number of plant growth resources and costs associated with the resources that may vary with a resource cost time period during which the resources are to be expended, and determining based on the resource cost time period respective amounts of the resources that should be expended during the time period to achieve the desired plant production rate. The determinations may be made periodically for a plurality of time intervals within each resource cost time period and/or upon a change to a differing resource cost time period.

In particular embodiments, the resources comprise electricity for a lighting system and carbon dioxide ($CO_2$). The resource cost time period may be defined as peak periods and non-peak periods having different costs for a resource. One or more of the resources may be applied to supplement a naturally occurring component of the resource (e.g., sunlight) that may also be varying, according to a natural resource time period (e.g., daytime and nighttime) or due to some loss of resource, such as $CO_2$ decay from ventilation or infiltration of a greenhouse.

The systems and methods of the present invention take into account in the determination of the amounts of the resources to be expended in subsequent time intervals the proportional plant growth that has been achieved up to the point of the determination. Predictions of environmental conditions over subsequent time intervals that affect the plant production rate may also be calculated, including outdoor air temperatures, solar intensity, and ventilation rates from a greenhouse encompassing the plant.

Simulations are presented below of a computer algorithm that considers a range of light and $CO_2$ control combinations for the next decision period (time interval), estimates the ventilation rate expected, and finds the optimum (lowest cost) combination of resources for achieving the desired plant production rate.

BRIEF DESCRIPTION OF THE FIGURES

For a better understanding of the present invention, together with other and further objects thereof reference is made to the accompanying drawing and detailed description, wherein.

DETAILED DESCRIPTION OF THE INVENTION

Figure 1:
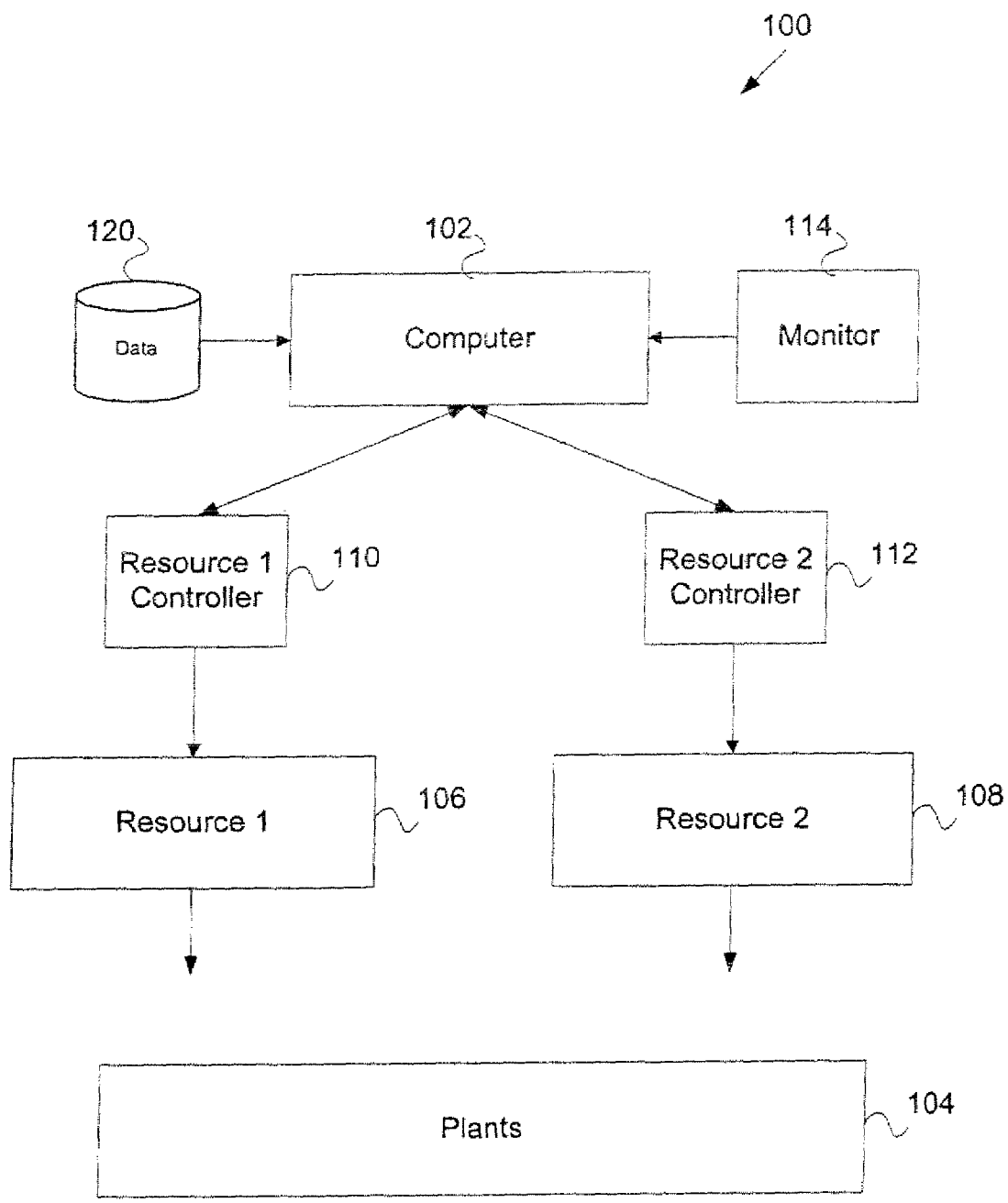
FIG. 1 is a block diagram of a hardware and operating environment in which different embodiments of the invention can be practiced.

In the following description, reference is made to the accompanying figures in which appear reference numbers corresponding to identical components as described below. The invention is shown by way of illustration specific exemplary embodiments. These embodiments are described in sufficient detail to enable those skilled in the art to practice the invention, and it is to be understood that other embodiments may be utilized and that logical, mechanical, electrical and other changes may be made without departing from the scope of the present invention.

Some portions of the detailed descriptions that follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent, finite, sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

The detailed description that follows comprises multiple sections. A first section describes a hardware and software environment according to embodiments of the invention. A second section describes a method according to an embodiment of the invention. A third section provides a description of various parameters and formulas used in embodiments of the invention in which light and carbon dioxide resources are managed in a manner to minimize overall operating cost, and a general analysis of the models presented follows in a fourth section along with a discussion of the equivalence of instantaneous photosynthesis and the photosynthesis curves as found in the Both, et al. (2000) reference mentioned above. Exemplary simulated results are provided in a fifth section for practicing methods according to the invention, and conclusions are presented in the final section.

1. Operating Environment

FIG. 1 is a block diagram of a hardware and operating environment in which different embodiments of the invention can be practiced. In some embodiments, environment 100 resides in a greenhouse and includes a computer 102, a database 120, resource controllers 110 and 112 operable to control resources 106 and 108 respectively. Resources 108 are directed to the production of plants 104. Computer 102 may be any general purpose computer, including personal computers, programmable logic controllers, server computers, mainframe computers, laptop computers, personal digital assistants or combinations of the above distributed in a network environment. Further details regarding computer 102 are provided below with reference to FIG. 2.

Database 120 provides storage for programs and data used by computer 102. Database 120 may be a disk resident database, or database 120 may be a memory resident database.

The invention is not limited to a particular database type. In some embodiments, database 120 maintains information regarding first resource 106 and second resource 108. This information may include cost data and time period data that may be associated with the cost data.

First resource 106 and second resource 108 are resources directed to the production of plants 104. In some embodiments of the invention, first resource 106 comprises electricity that controls supplemental lighting used to produce plants 104. In some embodiments, second resource 108 comprises supplemental carbon dioxide ($CO_2$) that may be administered to produce plants 104. However, the invention is not limited to a particular resource and alternative resources may be used in addition to or instead of supplemental light and $CO_2$.

First resource controller 110 is communicably coupled to computer 102 and is used to control the administration of first resource 106. In some embodiments, first resource controller 110 is operable to control whether supplemental lighting is turned on or off. In some embodiments, the supplemental lighting is either all on or all off. In alternative embodiments of the invention, various combinations of lights may be turned on and off to achieve a desired lighting amount. In further alternative embodiments, dimming ballasts may be used in conjunction with the supplemental lighting to achieve a desired lighting amount.

Second resource controller 108 controls the output of the second resource 108. In embodiments where second resource 108 is $CO_2$, second resource controller 112 controls the output of $CO_2$ into the plant's environment.

Some embodiments of the invention include a monitor 114 that monitors the ventilation rate in environment 100. In some embodiments, $CO_2$ is used as a tracer gas to monitor the ventilation rate in environment 100. The use of $CO_2$ as a tracer gas is known in the art.

Figure 2:
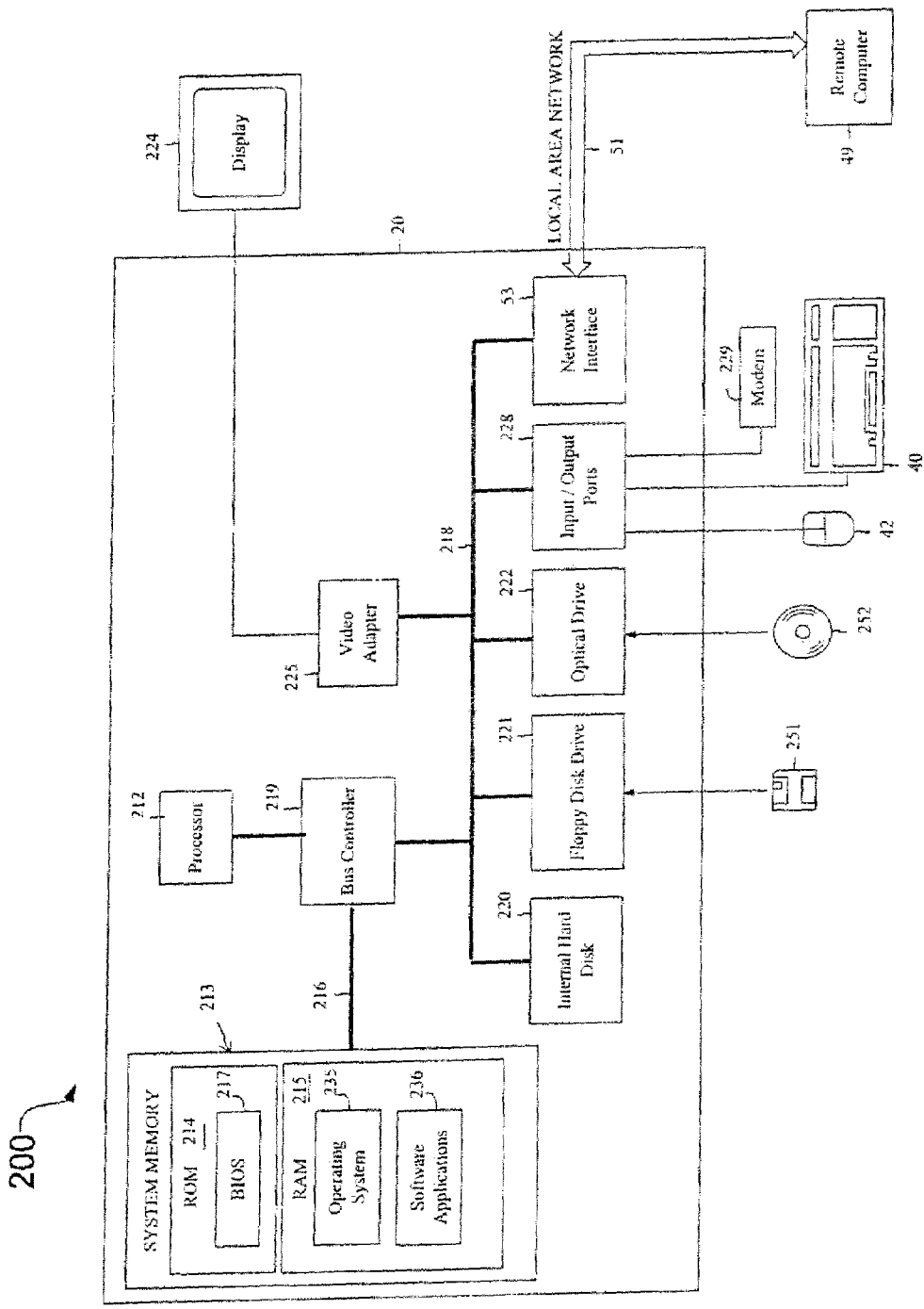
FIG. 2 is a diagram providing further details of a host computer environment according to an embodiment of the invention.

FIG. 2 is a diagram providing further details of a host computer 102 in conjunction with which embodiments of the invention may be practiced. The description of FIG. 2 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer or a server computer. Generally, program modules include routines, programs, objects, components, data structures, etc., that perform particular tasks or implement particular abstract data types.

Moreover, those skilled in the art will appreciate that the invention may he practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

As shown in FIG. 2, the computing system 200 includes a processor. The invention can be implemented on computers based upon microprocessors such as the PENTIUM® family of microprocessors manufactured by the Intel Corporation, the MIPS® family of microprocessors from the Silicon Graphics Corporation, the POWERPC® family of microprocessors from both the Motorola Corporation and the IBM Corporation, the PRECISION ARCHITECTURE® family of microprocessors from the Hewlett-Packard Company, the SPARC® family of microprocessors from the Sun Microsystems Corporation, or the ALPHA® family of microprocessors from the Compaq Computer Corporation, Computing system 200 represents any personal computer, laptop, server, or even a battery-powered, pocket-sized, mobile computer known as a hand-held PC.

The computing system 200 includes system memory 213 (including read-only memory (ROM) 214 and random access memory (RAM) 215), which is connected to the processor 212 by a system data/address bus 216. ROM 214 represents any device that is primarily read-only including electrically erasable programmable read-only memory (EEPROM), flash memory, etc. RAM 215 represents any random access memory such as Synchronous Dynamic Random Access Memory.

Within the computing system 200, input/output bus 218 is connected to the data/address bus 216 via bus controller 219. In one embodiment, input/output bus 218 is implemented as a standard Peripheral Component Interconnect (PCI) bus. The bus controller 219 examines all signals from the processor 212 to route the signals to the appropriate bus. Signals between the processor 212 and the system memory 213 are merely passed through the bus controller 219. However, signals from the processor 212 intended for devices other than system memory 213 are routed onto the input/output bus 218.

Various devices are connected to the input/output bus 218 including hard disk drive 220, floppy drive 221 that is used to read floppy disk 251, and optical drive 222, such as a CD-ROM drive that is used to read an optical disk 252. The video display 224 or other kind of display device is connected to the input/output bus 218 via a video adapter 225.

A user enters commands and information into the computing system 200 by using a keyboard 40 and/or pointing device, such as a mouse 42, which are connected to bus 218 via input/output ports 228. Other types of pointing devices (not shown in FIG. 2) include track pads, track balls, joy sticks, data gloves, head trackers, and other devices suitable for positioning a cursor on the video display 224.

As shown in FIG. 2, the computing system 200 also includes a modem 229. Although illustrated in FIG. 2 as external to the computing system 200, those of ordinary skill in the art will quickly recognize that the modem 229 may also be internal to the computing system 200. The modem 229 is typically used to communicate over wide area networks (not shown), such as the global Internet. The computing system may also contain a network interface card 53, as is known in the art, for communication over a network.

Software applications 236 and data are typically stored via one of the memory storage devices, which may include the hard disk 220, floppy disk 251, CD-ROM 252 and are copied to RAM 215 for execution. In one embodiment, however, software applications 236 are stored in ROM 214 and are copied to RAM 215 for execution or are executed directly from ROM 214.

In general the operating system 235 executes software applications 236 and carries out instructions issued by the user. For example, when the user wants to load a software application 236, the operating system 235 interprets the instruction and causes the processor 212 to load software application 236 into RAM 215 from either the hard disk 220 or the optical disk 252. Once software application 236 is loaded into the RAM 215, it can be used by the processor 212. In case of large software applications 236, processor 212 loads various portions of program modules into RAM 215 as needed.

The Basic Input/Output System (BIOS) 217 for the computing system 200 is stored in ROM 214 and is loaded into RAM 215 upon booting. Those skilled in the art will recognize that the BIOS 217 is a set of basic executable routines that have conventionally helped to transfer information between the computing resources within the computing system 200. These low-level service routines are used by operating system 235 or other software applications 236.

In one embodiment computing system 200 includes a registry (not shown) that is a system database that holds configuration information for computing system 200. For example, Windows® 95, Windows 98®, Windows® NT, Windows 2000® and Windows XP® by Microsoft maintain the registry in two hidden files, called USER.DAT and SYSTEM.DAT, located on a permanent storage device such as an internal disk.

This section has described various hardware and software components according to various embodiments of the invention. The next section will describe methods used in the operation of the system in various embodiments.

2. Methods of the Invention

2.1 General Plant Production Method

FIGS. 3A-3D are flowcharts illustrating methods for controlling plant production resources according to an embodiment of the invention. The methods to be performed by the operating environment constitute computer programs made up of computer-executable instructions. The methods illustrated in FIGS. 3A-3D are inclusive of acts that may be taken by an operating environment such as described above.

Figure 3A:
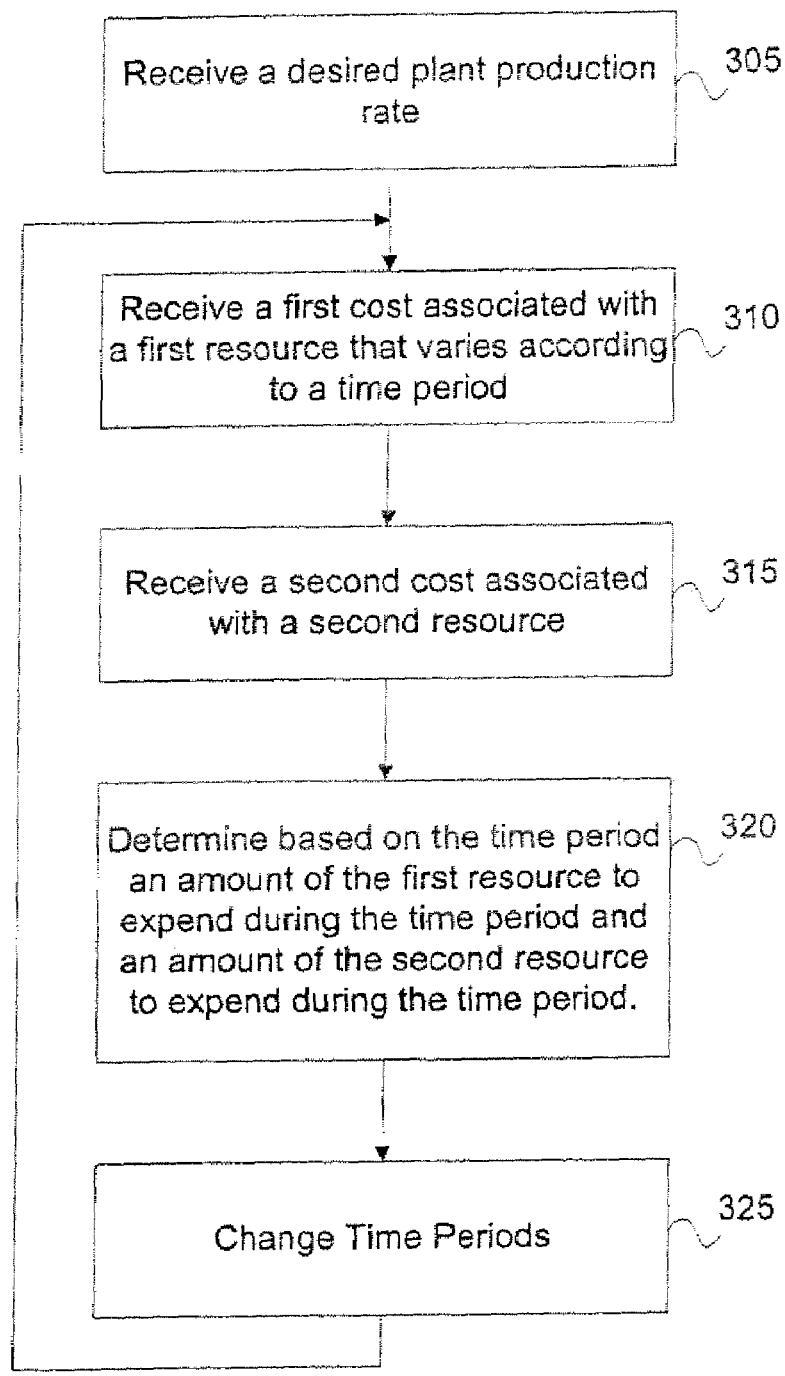
FIGS. 3A-3D are flowcharts illustrating methods for controlling plant production resources according to an embodiment of the invention.

FIG. 3A illustrates a method for controlling plant production wherein at least two resources are controlled. In some embodiments, the method begins by receiving a desired plant production rate (block 305). The desired plant production rate may vary depending on the plant being grown. In some embodiments, the desired plant production rate is related lettuce production. Typically the desired plant production rate will depend on at least two resources. In some embodiments, a first resource comprises lighting and a second resource comprises $CO_2$. The first and second resource may include two components, a naturally occurring component and a supplemented component. For example, in some embodiments, naturally occurring lighting from the sun may be supplemented with artificial lighting, and ambient levels of $CO_2$ may be supplemented with purchased $CO_2$.

Next the system receives a first cost associated with supplementing the first resource (block 310). Typically supplementing a resource will have a cost associated with it. In some embodiments, the cost of supplementing at least the first resource varies depending on a time period. In some embodiments, the time period comprises a peak time period and a non-peak time period. Additionally, there may be other time periods involved, such as a daytime period and a nighttime period.

Next, the system receives a cost associated with supplementing the second resource (block 315). The second resource also typically has a cost associated with it. This cost may or may not vary depending on the time period.

Note that while two resources have been described, the present invention is not limited to any particular number of resources, and in alternative embodiments, three or more resources may have costs associated with them that are analyzed by various embodiments of the invention.

Next, the system determines the amount of the first resource and the second resource that will be expended during the time period. Thus in some embodiments, if the cost data indicates that the amount of electricity that would need to be applied for supplemental lighting to achieve the desired growth rate is more expensive than the amount of $CO_2$ that would need to be applied to achieve the desired growth rate, the system will favor using supplemental $CO_2$ over supplemental lighting. Alternatively, if the cost of applying $CO_2$ is more expensive, the system will favor using supplemental lighting instead of supplemental $CO_2$. Those of skill in the art will appreciate that the concept can be applied to other resources used in plant production.

Note that the effectiveness of expending a resource may be limited by external factors such as the naturally occurring amount of the resource. For example, it may not be cost-effective to provide supplemental lighting during daylight hours since the additional benefit provided by the supplemental lighting may be negligible in comparison with benefit obtained by the naturally occurring (and therefore cost-free) lighting. Similarly, if the amount of $CO_2$ naturally occurring in the environment is sufficiently high, it may not be cost-effective to introduce more $CO_2$ if the plants cannot absorb the additional amount, and/or if ventilation passes some upper limit, supplementing $CO_2$ becomes more expensive because of rapid losses out the greenhouse vents.

However, it should be noted that it may be necessary to provide supplemental lighting during daylight hours if the day is comparatively dark, which may occur for example on days during the winter. In some embodiments, if the natural light level is high and adding supplemental light would put the plants into a light saturation situation, the system generally predicts a sufficient light integral for the daylight hours using the equations defined below such that it would be unlikely to turn the supplemental lights on. When supplemental lighting is needed on particular days to reach the desired light integral, the lighting is typically done during the night to the extent possible, using the off-peak electric rates.

Next the system receives an indication that the time has moved into a different time period (block 325). The system returns to block 310 in order to redetermine which resource is more cost-effective to achieve the desired production rate.

2.2 Detailed Example of Plant Production Method

Figure 3B:
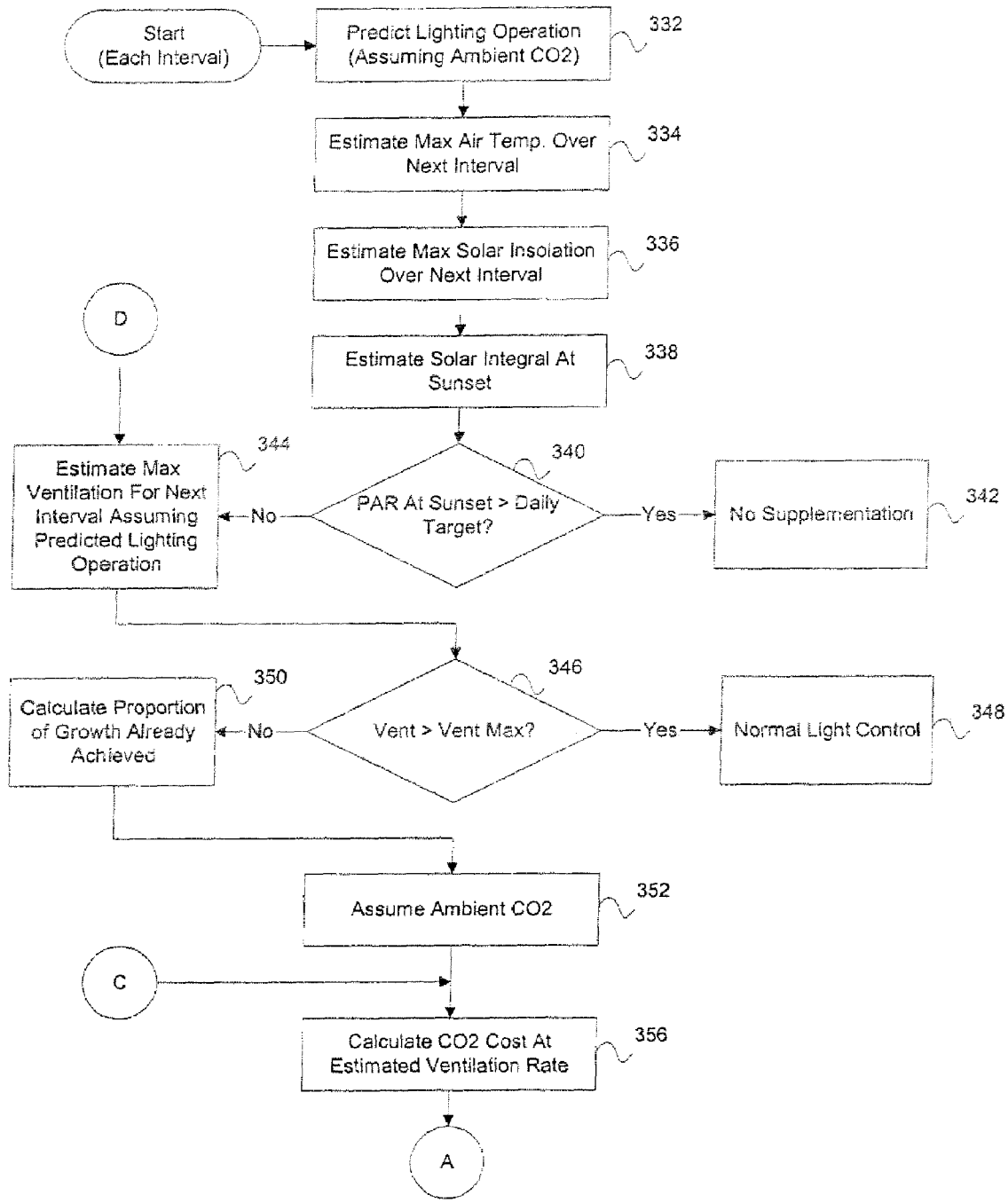
Figure 3C:
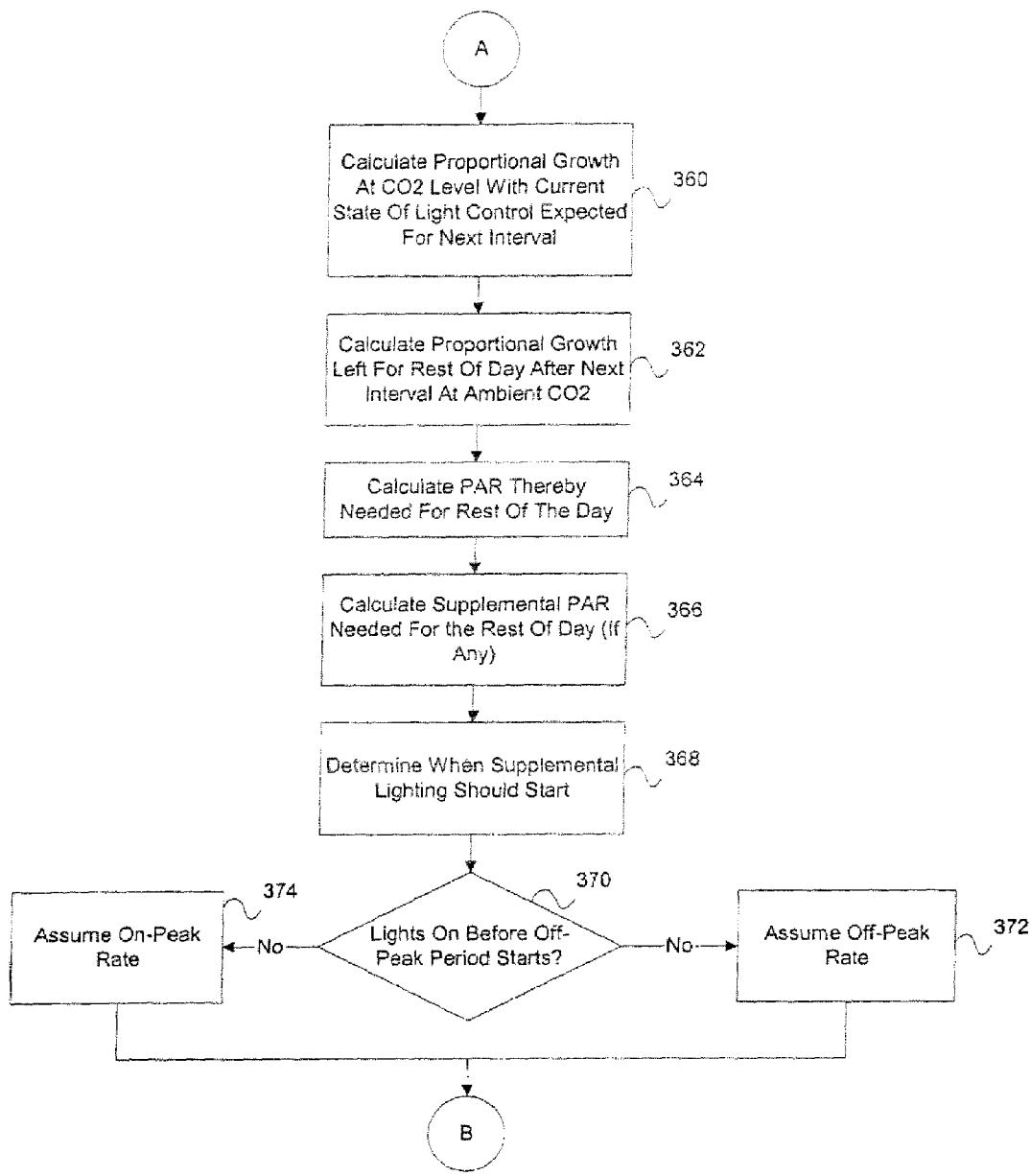
Figure 3D:
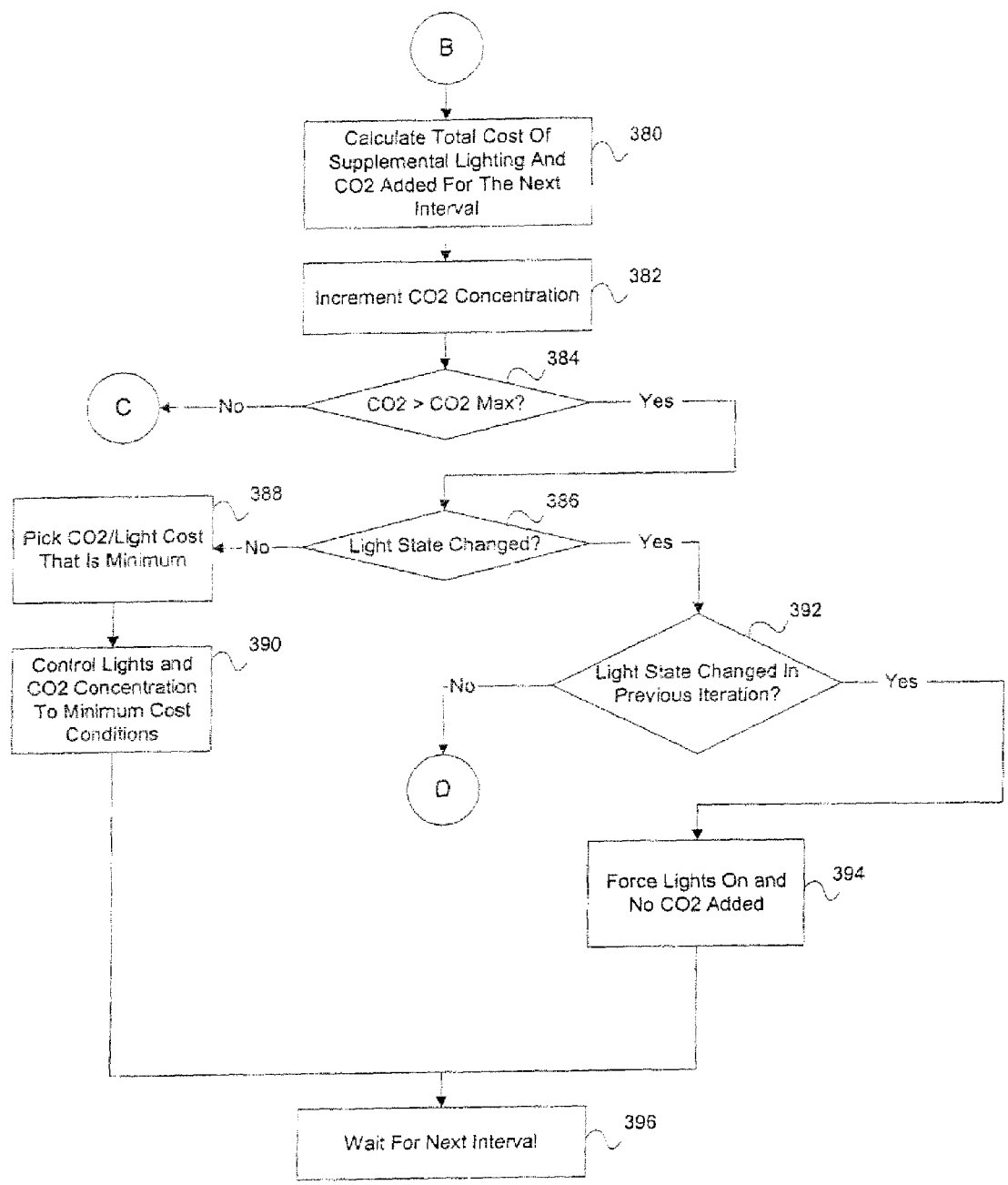

FIGS. 3B-3D illustrates a method executed by an operating environment according to embodiments of the invention, and provides further details on the method illustrated above in FIG. 3A where the first resource is light and the second resource is $CO_2$. In some embodiments, a day or other time period is divided into intervals, and the tasks illustrated in FIGS. 3B-3D may be performed once during each interval. In particular embodiments of the invention, the chosen interval is one hour.

The method begins by predicting lighting operation for the interval assuming ambient levels of $CO_2$ (block 332). In some embodiments, the prediction includes the control of the state of supplemental light and/or movable shades that determine the light within a greenhouse.

Next, in some embodiments, the system estimates the maximum air temperature over the interval (block 334). In some embodiments, the current temperature is obtained, for example from sensors communicably coupled to the system. Alternatively, the current temperature may be obtained from other sources, such as sites on the Internet that provide local weather data.

In some embodiments, the system estimates the maximum air temperature for the interval by taking the current interval reading, and the previous two interval readings, and fits a second order equation to them (examples include but are not limited to linear, polynomial, trigonometric, and spline functions) and extrapolates to the next time interval. In alternative embodiments, a linearized version of the second order equations may be used to estimate the maximum temperature over the interval. The present invention is not limited to any particular method for estimating the maximum temperature over the interval.

Additionally, the system estimates the maximum solar insolation that will occur over the next interval (block 336). In some embodiments, this prediction may utilize the equations defined below along with solar insolation data accumulated since sunrise. The system also estimates the solar integral at sunset (block 338).

Using the estimates determined above, the system then checks to see whether the predicted photosynthetic active radiation (PAR) due to sunlight will be greater than the daily target required to meet desired plant production (block 340). If so, then no lighting supplementation is require (block 342). Shading control may be required to prevent oversaturation.

Alternatively, if the estimated PAR at sunset is less than the daily target value, the system then proceeds to determine how to apply supplemental lighting and/or supplemental $CO_2$. In some embodiments, the system uses the predicted lighting operation from block 332 and estimates the maximum ventilation for the next interval (block 344). In some embodiments, the predicted PAR and predicted maximum outdoor air temperature are used in an energy balance to predict the maximum ventilation rate during the next interval (to maintain the indoor temperature at the desired level). A further discussion of this technique is described below in Section 5. It is noted that in winter in cold climates, the desired rate will be zero and heating is needed. But there is typically always infiltration at some level.

A check is then made to determine if the estimated ventilation rate exceeds a ventilation maximum (block 346). If the predicted ventilation is above some threshold value where $CO_2$ could be profitable (e.g., more than 4 or 5 air changes per hour, or a comparable value), then the system proceeds to use lighting control to provide supplemental lighting (block 348).

Alternatively, if the predicted ventilation is below, the threshold value where $CO_2$ could be profitable then the system calculates the proportion of desired growth already achieved for the day (block 350). Each interval of the day since sunrise has its value of light integral for the past interval, and the average $CO_2$ concentration that existed for that interval. The equation that relates light integral and $CO_2$ level to achieve the same growth is provided below. The $CO_2$ level that existed can be used with that equation to determine the accompanying light integral target. The actual light integral for the interval, divided by the accompanying light integral target, will be a fraction less than unity and represents the proportional growth that interval contributed to the day.

These proportional growth values for each interval since sunrise up to the current interval may be added to get the proportional growth accumulated for the day so far. The target for the end the day is 1.0, representing 100%.

The system is then set to assume ambient levels of $CO_2$ (block 352). The system then calculates the cost of providing supplemental $CO_2$ at the estimated ventilation rate (block 356).

Next the system calculates the proportional growth that would be achieved if the rest of the day is at ambient $CO_2$, and the accompanying light integral that would be needed at ambient $CO_2$ using the current state of lighting control expected for the interval (block 360). The system then determines the proportional growth remaining for the rest of the day (block 362). From the proportional growth remaining, the system determines the PAR value needed for the rest of the day to achieve the remaining proportional growth (block 364). The system then determines whether supplemental light will be needed for any part of the rest of the day in order to achieve the desired PAR value (block 366). From this value, the system determines when the supplemental light would have to start to reach the integral target (block 368).

A check is made to determine if the supplemental lighting must be applied before off-peak rates start (block 370). If not, the system assumes off-peak rates for supplemental lighting costs estimated in the next blocks (block 372). Otherwise, the system assumes on-peak rates for supplemental lighting (block 374).

Next, the system uses the on-peak or off-peak rates to determine the cost of lighting for the next interval and also determines the cost of supplemental $CO_2$ for the next interval (block 380). The $CO_2$ concentration is also incremented to account for any supplemental $CO_2$ that may be added during the interval (block 382).

A check is made to determine if the $CO_2$ to be added would exceed a maximum level of $CO_2$ that can be utilized by the plants (block 384). If not, the system proceeds back to block 356 to recalculate values based on the incremented $CO_2$ level.

Otherwise, the system next determines if the lighting state changed (block 386). If the lighting state changes, the system then checks to see if the lighting state was changed in a previous iteration in this interval (block 392). If not, the system proceeds to block 344 to go through the loop again because the system started with the assumption the $CO_2$ was at the ambient level, and it will now not be at the ambient level due to the predicted supplementation of $CO_2$. If the state did change in a previous iteration and the state changes again, the loop is indefinite. In some embodiments, supplemental lighting is forced on and no $CO_2$ is added (block 394).

However, if the lighting state does not change, the system proceeds to make a determination of the most cost effective light integral/$CO_2$ concentration combination based on the lighting cost (if any) plus the $CO_2$ cost based on the predicted ventilation rate (block 388). The system chooses the combination with the lowest total cost of supplemental lighting and/or supplemental $CO_2$. Lighting and $CO_2$ resources are then controlled in accordance with the chosen combination (block 390.)

The system then waits until the beginning of the next interval (block 396), when the method illustrated in FIGS. 3B-3D may be repeated.

In some embodiments, the method illustrated above is modified to account for $CO_2$ decay. For example, if the previous interval led to control with $CO_2$ above ambient levels, and the next interval suggests only ambient, the system takes into consideration the decay of $CO_2$ concentration, particularly if ventilation is not high. This is desirable because the decay of $CO_2$ can affect the calculation of potential growth. In some embodiments, a simple mixing model can be used to predict the $CO_2$ decay for the next hour, and beyond if ventilation is low enough.

Additionally, the rate of adding $CO_2$, and its temporal change (decay rate), can be used to estimate the "current" ventilation rate, which can then be compared to the predicted to know whether it (the predicted) has been greatly exceeded.

Furthermore, in some embodiments, the system detects if conditions are far from the predicted conditions (e.g., due to a sudden weather change), and forces the system to a default state. In some embodiments, the default state assumes ambient $CO_2$.

Figure 4:
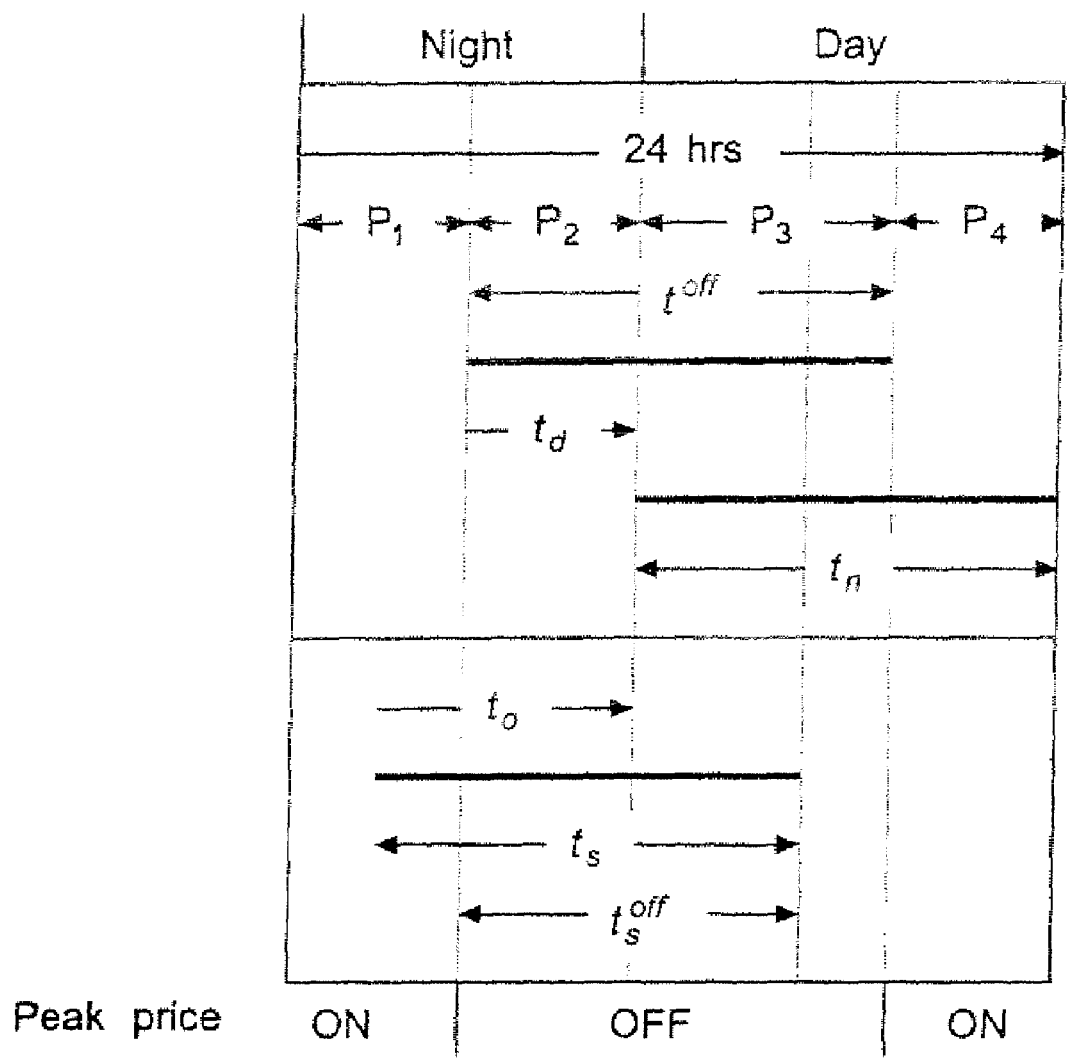
FIG. 4 is a diagram illustrating exemplary time periods used in various embodiments of the invention.

FIG. 4 illustrates a set of exemplary time periods. In the example, there are four time periods $P_1$-$P_4$, two defined by peak and non-peak electrical costs and two defined by daytime versus nighttime hours. In general, the daily cycle (with origin at sunset) may be divided into four periods as follows:

$P_1$ No natural light (night)+on-peak electricity price
$P_2$ No natural light+off-peak electricity price
$P_3$ Natural light (day)+off-peak electricity price
$P_4$ Natural light+on-peak electricity price Note that, depending on local conditions, one or more of these periods may not exist.

3. Exemplary Parameters and Functions

This section provides exemplary parameters used in various embodiments of the invention where the first and second resources comprise supplemental lighting and $CO_2$. This section also provides equations that may be used by various embodiments to assist in determining optimal combinations of supplemental light and $CO_2$ depending on a time period.

The following notations will be used in this section. Where a term is not defined here, its meaning in the art should be used.

| | Main Symbols | |
|---|---|---|
| $C_L$ | unit cost of supplementary light | \$/mol[PAP] |
| $C_X$ | unit cost of $CO_2$ | \$/mol[$CO_2$] |
| f{L} | value of X which for given L results in desired production rate | mol[$CO_2$]/mol[air] |
| J | daily costs | \$/(m$_2$[ground]d) |
| L | light integral | mol[PAP]/(m$^2$[ground]d) |
| m | $CO_2$ taken up by plants at desired production rate | mol[$CO_2$]/(m$^2$[ground]d) |
| Q | ventilation rate | m$^3$[air]/(m$^2$[ground]s) |
| t | time of operation per day | s/d |
| W | electrical power for lights | W[elect]/m$^2$[ground] |
| X | $CO_2$ concentration | mol[$CO_2$]/mol[air] |
| γ | lamp efficiency | mol[PAP]/J[elect] |
| ρ | molar density of air | mol[air]/m$^3$[air] |
| | Subscripts | |
| d | lag of onset of natural light after onset of off-peak period | |
| L | light | |
| m | maximum | |
| n | natural | |
| o | overlap of natural and supplementary light | |
| s | supplementary | |
| t | total | |
| X | $CO_2$ | |
| | Superscripts | |
| off | off-peak | |
| on | on-peak | |

In the discussion in this section, it is assumed that the natural light integral and the (constant) ventilation rate for the day are known in advance. It is also assumed that the light-$CO_2$ combinations that produce the desired growth rate are known (see Both et al., 1997). Given the ventilation rate, Q, and the natural light integral inside the greenhouse, $L_n$, the $CO_2$ concentration, $X_t$, which minimizes the cost of operation while maintaining the desired rate of growth is desired. The analysis starts by inspecting a candidate solution for the supplementary light integral, $L_s$ as illustrated in FIG. 5.

Figure 5:
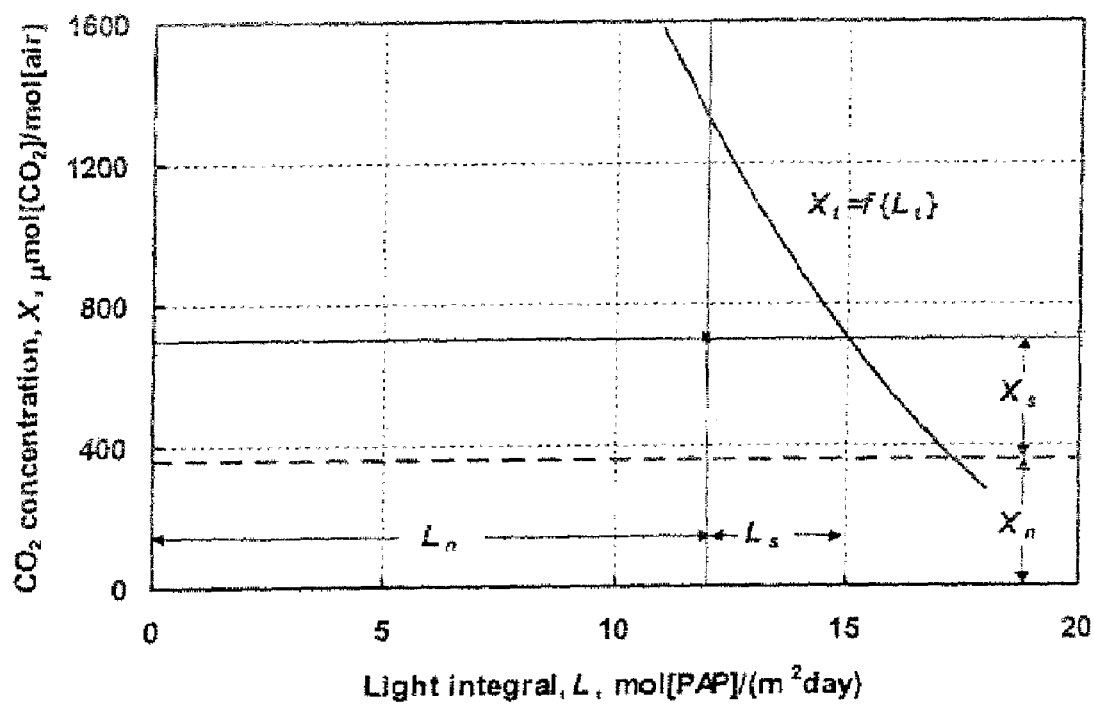
FIG. 5 is a schematic presentation of an L-X plane according to an embodiment of the invention.

FIG. 5 is a schematic presentation of the L-X plane. The square point is the candidate solution. The horizontal dashed line is the natural level of $CO_2$ concentration. The curve connects all the points that produce the desired rate of growth. $L_t \equiv L_n + L_s$ and $X_t \equiv X_n + X_s$.

4. General Analysis

The length of the supplementary light period may be uniquely determined by the proposed solution and it is proportional to $L_s$ $$t_s = \frac{L_s}{\gamma W}. \quad [1]$$

The cost of the added light depends, however, on its timing. In general, the daily cycle (with origin at sunset) may be divided into four periods as discussed above with reference to FIG. 4.

The cost of supplementary light for the day depends on how it is divided between the on-peak and off-peak periods $$J_L = C_L^{off} L_s^{off} + C_L^{on} L_s^{on} = \gamma W [C_L^{off} t_s^{off} + C_L^{on} (t_s - t_s^{off})] \quad [2]$$

The cost of supplementary $CO_2$ for the day depends on the union $t_X = t_s \cap t_n$.

$$J_X = C_X [\rho Q X_s t_X + m] \quad [3]$$

There are 6 possible combinations of $t_s$ and $t_n$. The one in FIG. 4, for example yield $$t_X = t_n + t_o. \quad [4]$$

The total cost is

[1][2][3]

$$J = J_L + J_X = \gamma W [C_L^{off} t_s^{off} + C_L^{on} (t_s - t_s^{off})] + C_X [\rho Q X_s t_X + m]. \quad [6]$$

The constraints on the control are $$0 \leq L_s \leq L_m = 24 \times 3600 \times \gamma W \quad 0 \leq X_s \leq X_m. \quad [7]$$

Given the relationship $$X_t = f\{L_t\} \quad [8]$$

between $$X_t = X_n + X_s \quad [9]$$

and $$L_t = L_n + L_s \quad [10]$$

that yields the desired production target (FIG. 5), the cost becomes $$J = J_L + J_X = \gamma W [C_L^{off} t_s^{off} + C_L^{on} (t_s - t_s^{off})] + C_X [\rho Q (f\{L_t\} - X_n) t_X + m] \quad [11]$$

The value of J depends on the times of turning the lights on and off. These are equivalent to $t_s$ and $t_o$ of FIG. 4. Hence the search for the minimum of J may be carried out over the two dimensional [$t_s$, $t_o$] space.

Three different prices affect the cost of operation (Equation [11]): $C_L^{off}$, $C_L^{on}$ and $C_X$. The order in which the periods $P_1$ to $P_4$ are to be selected for supplemental lighting, depends on the two ratios between these three prices. Whatever the prices, the best period to start is $P_3$, if it exists, because electricity costs are low and $CO_2$ enrichment time, $t_X$, is at its minimum ($t_n$). If $CO_2$ cost is negligible relative to electricity cost (depending also on the rate of ventilation), the next choice would be $P_2$, then $P_4$ and finally $P_1$. (Enrichment during $P_3$ is never more expensive per unit time than enrichment during $P_2$, and enrichment during $P_4$ is never more expensive than enrichment during $P_1$). If the price of $CO_2$ is relatively high, the choice of enrichment period, following $P_3$, would be $P_4$, then $P_2$ and finally $P_1$.

At one test location Period $P_3$ (daytime and off-peak electricity price) does not exist and the first period of choice is either $P_2$ (night and off-peak), or $P_4$ (day and on-peak). The last period is $P_1$ (night and on-peak). The calculation for the sequence starting with $P_2$ now follows.

4.1 Period $P_2$: Off-Peak Electricity Price: No Natural Light

The cost function [11] for this case is $$J = \qquad [12]$$

$$J_L + J_X = C_L^{off}(L_t - L_n) + C_X\left[\rho Q(f\{L_t\} - X_n)\left(t_n + \frac{L_t - L_n}{\gamma W}\right) + m\right].$$

The extrema with respect to $L_t$ for given $L_n$ and $X_n$, are given by $$\frac{dJ}{dL_t} = 0 = C_L^{off} + C_X \frac{\rho Q}{\gamma W}\left[(\gamma W t_n + L_t - L_n)\frac{df\{L_t\}}{dL_t} + (f\{L_t\} - X_n)\right] \qquad [13]$$

which shows that for a given ventilation rate, the bracketed factor is constant and that the solution for $L_t$, and hence for $X_s$, does depend, in general, on $L_n$, the amount of natural light. The second derivative of [12], namely $$\frac{d^2 J}{dL_t^2} = C_X \frac{\rho Q}{\gamma W}\left[2\frac{df\{L_t\}}{dL_t} + (\gamma W t_n + L_t - L_n)\frac{d^2 f\{L_t\}}{dL_t^2}\right], \qquad [14]$$

may be used to distinguish between maximum, minimum and inflexion.

Note that if the minimum indicated by [13] is outside the feasible region, the solution lies either on the borders of $X$ given by [7] or on the function given by [8] or on $$X_t = f\{L_n + L_s^{off}\} \qquad [15]$$

where $$L_s^{off} = \gamma W t^{off} \qquad [16]$$

4.1.1 Quadratic Approximation

Approximating $f\{L_t\}$ by a quadratic function $$X_t = f\{L_t\} = aL_t^2 + bL_t + c, \qquad [17]$$

Equation [13] becomes $$[(\gamma W t_n + L_t - L_n)(2aL_t + b) + (aL_t^2 + bL_t + c - X_n)] = -\frac{\gamma W}{\rho Q}\frac{C_L^{off}}{C_X}, \qquad [18]$$

or $$[3a]L_t^2 + [2a(\gamma W t_n - L_n) + 2b]L_t + \left[b(\gamma W t_n - L_n) + c - X_n + \frac{\gamma W}{\rho Q}\frac{C_L^{off}}{C_X}\right] \equiv AL_t^2 + BL_t + C = 0 \qquad [19]$$

Equation [19] is a quadratic equation in $L_t$, with $L_n$ and $Q$ as parameters for a given day-length $t_n$. The solutions, if they exist, are calculated as $$L_t = \frac{-B \pm \sqrt{B^2 - 4AC}}{2A}. \qquad [20]$$

In the normal range of values, the solution with the + sign is a minimum, while the other solution is a maximum. When the discriminant is negative, there is no minimum, just an inflexion point, and the optimum is obtained on the border of the feasible region.

4.1.2 Linear Approximation

Approximating $f\{L_t\}$ by a linear function $$X_t = f\{L_t\} = bL_t + c, \qquad [21]$$

Equation [13] becomes $$[(\gamma W t_n + L_t - L_n)b + (bL_t + c - X_n)] = -\frac{\gamma W}{\rho Q}\frac{C_L^{off}}{C_X}, \qquad [22]$$

and the second derivative, Equation [14]

$$\frac{d^2 J}{dL_t^2} = \frac{2 C_X \rho Q}{\gamma W} b \qquad [23]$$

is always negative. Hence the extremum (the solution of equation [22]) is a maximum and the optimum (a minimum) will lie on the border of the feasible region.

Inverting equation [21]

$$L_t = \frac{X_t - c}{b} \qquad [24]$$

$$J = C_L^{off}\left(\frac{X_t - c - bL_n}{b}\right) + C_X\left[\rho Q(X_t - X_n)\left(t_n + \frac{X_t - c - bL_n}{b\gamma W}\right) + m\right]. \qquad [25]$$

at the upper bound of X $$J_m = \qquad [26]$$

$$C_L^{off}\left(\frac{X_{tm} - c - bL_n}{b}\right) + C_X\left[\rho Q(X_{tm} - X_n)\left(t_n + \frac{X_{tm} - c - bL_n}{b\gamma W}\right) + m\right],$$

and at the lower bound (where $X_t - X_n = 0$)

$$J_0 = C_L^{off}\left(\frac{X_n - c - bL_n}{b}\right) + C_X m, \qquad [27]$$

$J_0$ being independent of the ventilation rate.

4.1.3 Michaelis-Menten Approximation

Modifying the instantaneous Michaelis-Menten equation for constant environmental conditions $$X_t = f\{L_t\} = \frac{g}{t_n}\frac{L_t}{(L_t - h)}, \qquad [28]$$

the optimum total light level, based on Equation [13] becomes $$L_t = h + \sqrt{\frac{[\gamma W t_n - (L_n - h)]h}{\left(\frac{C_L^{off}}{C_X}\frac{\gamma W}{\rho Q} - X_n\right)\frac{t_n}{g} + 1}}, \quad [29]$$

which shows that the optimum supplementary light depends on the level of natural light. Note: The equivalence between Equations [28] and [56] (see Section 4.5) is $$X_t = x, \ L_t = I = i\tau, \ g = B^+/A^+, \ h = 1/A^+, \ t_n = \tau; \quad [29a]$$

4.2 Periods $P_2$ (Off-Peak; Night) and $P_4$ (On-Peak; Day)

If the day under consideration is dull and $P_2$ is not long enough to supply all the required light integral, light must also be applied during P4 (recall that P3 is assumed not to exist), and the cost function [11] becomes $$J = J_L + J_X = C_L^{off} L_s^{off} + C_L^{on}(L_t - L_n - L_s^{off}) + C_X[\rho Q(f\{L_t\} - X_n)(t_n + t_s^{off}) + m]. \quad [30]$$

The extrema with respect to $L_t$ are, therefore $$\frac{dJ}{dL_t} = 0 = C_L^{on} + C_X \rho Q(t_n + t_s^{off})\frac{df\{L_t\}}{dL_t}. \quad [31]$$

4.2.1 Quadratic Approximation

For the quadratic approximation of $f\{L_t\}$ (Equation [17]), a single extremum is obtained $$L_t = -\frac{1}{2a}\left[\frac{C_L^{on}}{C_X \rho Q(t_n + t^{off})} + b\right], \quad [32]$$

which is a constant, independent of $L_n$.

The second derivative of [30] is $$\frac{d^2 J}{dL_t^2} = 2aC_X \rho Q(t_n + t^{off}) \quad [33]$$

and since a is positive, the extremum (Equation [32]) is a minimum.

4.2.2 Michaelis-Menten Approximation

In this case the optimum solution (Equation [31]) yields $$L_t = h + \sqrt{\frac{C_X \rho Q(t_n + t^{off})}{C_L^{on}}\frac{gh}{t_n}}. \quad [34]$$

which, again, is independent of $L_n$. The second derivative of [30] is in this case $$\frac{d^2 J}{dL_t^2} = C_X \rho Q(t_n + t^{off})\frac{gh}{t_n}\frac{2}{(L_t - h)^3}. \quad [35]$$

which in the relevant range ($L_t > h$) is positive and therefore indicates that the extremum (Equation [32]) is again a minimum. Hence the solutions for the quadratic approximation and for the M-M approximation (both convex downwards) are qualitatively similar.

4.3 Periods $P_2$ (Off-Peak; Night), $P_4$ (On-Peak; Day) and $P_1$ (On-Peak; Night)

If still not enough light is supplied, the luminaries may be also turned on during $P_1$ (on-peak price at night). The appropriate cost function for this situation is $$J = J_L + J_X = C_L^{off} L_s^{off} + \quad [36]$$

$$C_L^{on}(L_t - L_n - L_s^{off}) + C_X\left[\rho Q(f\{L_t\} - X_n)\left(\frac{L_t - L_n}{\gamma W}\right) + m\right]$$

The extrema with respect to $L_t$ for given $L_n$ and $X_n$ are given by $$\frac{dJ}{dL_t} = 0 = C_L^{on} + C_X\frac{\rho Q}{\gamma W}\left[(L_t - L_n)\frac{df\{L_t\}}{dL_t} + (f\{L_t\} - X_n)\right], \quad [37]$$

which, just as in the case of $P_2$, shows that for a given ventilation rate, the bracketed factor is constant and that the solution for $L_t$, and hence for $X_s$, does depend, in general, on $L_n$. The second derivative of [36]

$$\frac{d^2 J}{dL_t^2} = C_X\frac{\rho Q}{\gamma W}\left[2\frac{df\{L_t\}}{dL_t} + (L_t - L_n)\frac{d^2 f\{L_t\}}{dL_t}\right] \quad [38]$$

may be used to distinguish between maximum, minimum and inflexion.

4.3.1 Quadratic Approximation

For the quadratic approximation of $f\{L_t\}$ (Equation [17]), Equation [37] becomes $$[(L_t - L_n)(2aL_t + b) + (aL_t^2 + bL_t + c - X_n)] = -\frac{\gamma W}{\rho Q}\frac{C_L^{on}}{C_X}, \quad [39]$$

or $$[3a]L_t^2 + \begin{bmatrix}-2aL_n + \\ 2b\end{bmatrix}L_t + \begin{bmatrix}-bL_n + c - X_n + \\ \frac{C_L^{on}}{C_X}\frac{\gamma W}{\rho Q}\end{bmatrix} = AL_t^2 + BL_t + C \quad [40]$$
$$= 0.$$

Equation [40] is, again, a quadratic equation in $L_t$, with $L_n$ and Q as parameters for a given day-length $t_n$. The solutions, if they exist, are calculated as $$L_t = \frac{-B \pm \sqrt{B^2 - 4AC}}{2A}. \quad [41]$$

The only difference from $P_2$ (Equation [19]) is that B and C are slightly different.

4.4 Results of Analysis

Figure 6:
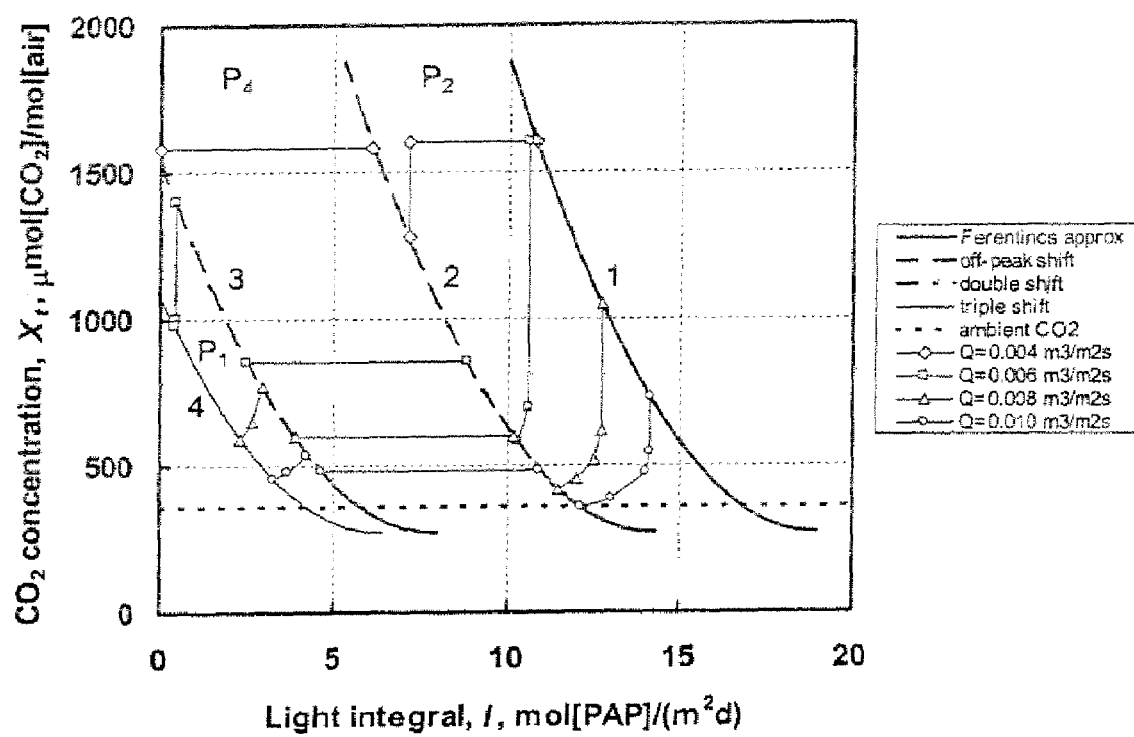
FIG. 6 is an illustration of optimal $CO_2$ concentration as a function of available natural light for several ventilation rates.
Figure 7:
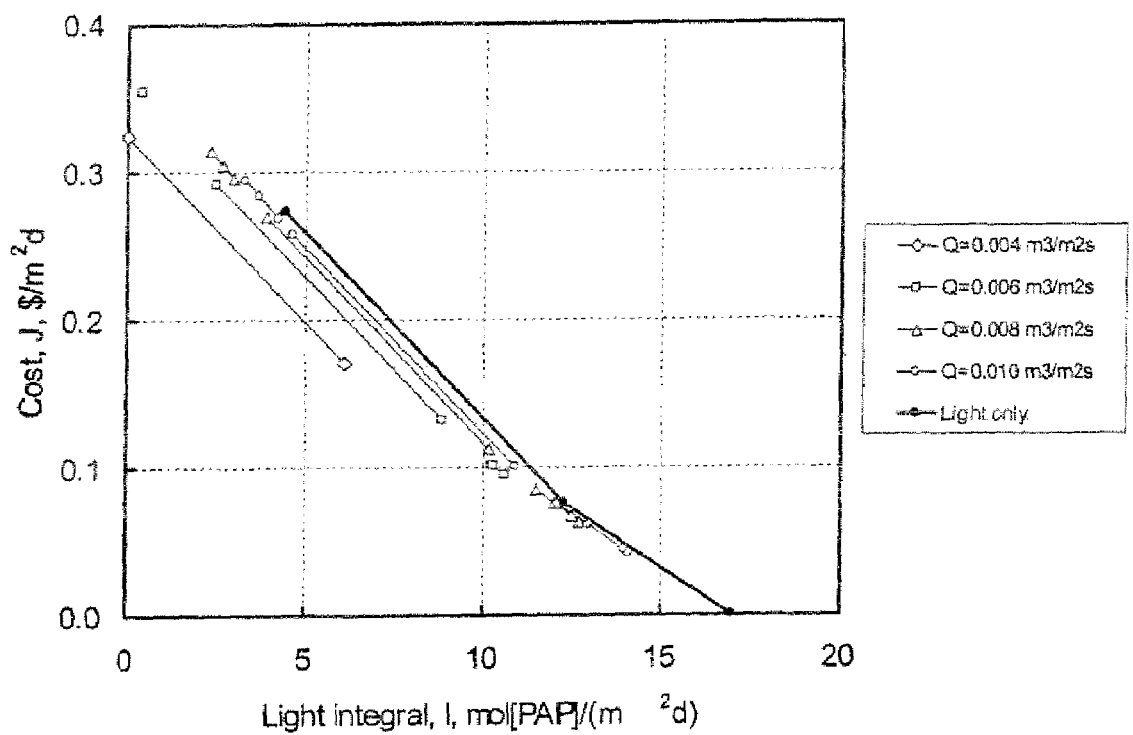
FIG. 7 is an illustration of the cost of the solutions shown in FIG. 6.

FIGS. 6 and 7 show results of the optimal $CO_2$ concentration and the associated cost function for the parameter values of Table 1 and for the lighting sequence $P_2, P_4, P_1$. A complete solution should also consider the sequence $P_4, P_2, P_1$. FIG. 6 shows the optimal $CO_2$ concentration as a function of available natural light integral (divided equally over 12 hours).

TABLE 1

Functional relationships

| | |
|---|---|
| Ferentinos quadratic approx | $X_t = f\{L_t\} = aL_t^2 + bL_t + c = (20.4L_t^2 - 769.6L_t + 7531) \times 10^{-6}$ |
| Both quadratic approximation | $X_t = f\{L_t\} = aL_t^2 + bL_t + c = (40.4L_t^2 - 1355L_t + 11690) \times 10^{-6}$ |
| linear approximation | $X_t = f\{L_t\} = bL_t + c = (-212L_t + 3800) \times 10^{-6}$ |
| M-M approximation | $X_t = f\{L_t\} = \frac{g}{ht_n}\left(\frac{L_t}{L_t/h - 1}\right) = 13.0\left(\frac{L_t}{0.092L_t - 1}\right) \times 10^{-6}$ |

Parameter values of an exemplary embodiment

| | |
|---|---|
| unit price of on-peak light | $C_L^{on} = 0.088\ \$/kW[elect]h = 0.0252\ \$/mol[PAP]$ |
| unit price of oil-peak light | $C_L^{off} = 0.056\ \$/kW[elect]h = 0.0160\ \$/mol[PAP]$ |
| unit price of $CO_2$ | $C_X = 0.14\ \$/kg[CO_2] \times 0.044\ kg[CO_2]/mol[CO_2] = 0.00616\ \$/mol[CO_2]$ |
| supplementary light flux | $W = 150\ W[elect]/m^2[ground]$ |
| lamp efficiency | $\gamma = 0.97 \times 10^{-6}\ mol[PAP]/J[elect]$ |
| molar density of air | $\rho = 1.2\ kg[air]/m^3[air] / 0.029\ kg[air]/mol[air] = 41.4\ mol[air]/m^3[air]$ |
| length of off-peak price period | $t^{off} = 9$ hrs (all at night = $P_2$ period; no $P_3$ period) |
| length of day-light | $t_n = 12$ hrs (on-peak price; period $P_4$) |

FIG. 6 illustrates optimal $CO_2$ concentration as a function of available natural light, for several ventilation rates, Q. The curve on the right (No. 1; Ferentinos approx) connects all combinations of light flux and $CO_2$ concentration which produce the desired daily target. The region between the parallel curves 1 and 2 provides supplementary light during the off-peak ($P_2$) period. The region between curves 2 and 3 is for additional light provided during period P4 (day-time and on-peak electricity price). The region between curves 3 and 4 is for additional light during period $P_1$ (night-time and on-peak electricity price). There are no feasible solutions to the right of curve 1, to the left of curve 4, below $X_t=360$ ppm and above $X_t=1600$ ppm. It should be noted that the particular values for $X_t$ (e.g. 360 ppm and 1600 ppm) are those used in an exemplary embodiment of the invention. No embodiment of the invention is limited to a particular lower or upper boundary for $X_t$.

Considering, for example, the (constant) ventilation rate of 0.008 $m^3[air]/(m^2[floor]s)$, the solution behaves as follows: As the natural light integral diminishes, the solution point first climbs along the Ferentinos approximation by increasing the $CO_2$ concentration, while refraining from adding supplementary light. As the maximum permissible $CO_2$ concentration (1600 ppm) is reached, any further loss of natural light must be replaced by supplementary light during the off-peak (low electricity price) period. As the natural light diminishes further. $CO_2$ enrichment becomes less economic (due to longer enrichment time) and the optimal $CO_2$ concentration decreases. When the off-peak period is exhausted, increasing the $CO_2$ concentration becomes attractive again for a while, until supplementing with on-peak light becomes necessary.

Enrichment during $P_4$ is at a constant concentration, independent of the length of supplementary lighting, because the length of enrichment period is constant (enrichment continues throughout the day even if no light is provided during $P_4$). When the end of $P_4$ is reached, there is again some incentive for trade-off between light and $CO_2$ concentration, without the need to increase enrichment time. As a result, the solution point climbs up curve 3 for a while, until switching to period $P_1$ (on-peak, night) is justified. The behavior in period $P_1$ is similar to that in $P_2$ and for the same reason. When curve 4 is reached, lights have been on for 24 hours and the only way to reach the target production is to add $CO_2$, climbing up curve 1. As expected, the optimal $CO_2$ concentration is higher for lower ventilation rates.

FIG. 7 shows the cost of the solutions of FIG. 6 and, in addition, the cost of adding light only (e.g., when high ventilation rates are required). The change in slope is due to switching from off-peak (9 hours) to on-peak (rest of day) electricity price. Light alone typically cannot efficiently produce the target at very low natural light integral levels, but it is always possible to reach the target by combining light and $CO_2$ enrichment. Wherever the light-only solution exists, it is the upper bound on the other solutions. The absolute saving from $CO_2$ enrichment is constant for $P_4$, but diminishes towards higher levels of natural light.

As illustrated in FIG. 7, gaps between segments are where the solutions climb along the curves of FIG. 6. A few of the solutions are not represented in this figure.

4.5 Equivalence between Curves of Both, et al. (2000) and Instantaneous Photosynthesis Note that the symbols in Table 2 may be different than elsewhere. The special notation used in herein is:

TABLE 2

Notation

| | | |
|---|---|---|
| $A^+$ | coefficient | $m^2d/mol[PAP]$ |
| $B^+$ | coefficient | $mol[C]s/(mol[PAP]m)$ |
| $C^+$ | coefficient | — |
| $D^+$ | coefficient | $m^2d/mol[PAP]$ |
| c | exponent in respiration equation | 1/K |
| F | deviation from daily goal | $mol[CO_2]/mol[air]$ |
| G | growth integral | $mol[C]/(m^2[ground]d)$ |
| $G^*$ | desired daily growth | $mol[C]/(m^2[ground]d)$ |
| g | net growth rate | $mol[C]/(m^2[ground]s)$ |
| I | light integral | $mol[PAP]/(m^2[ground]d)$ |
| i | light flux | $mol[PAP]/(m^2[ground]s)$ |
| J | fitting criterion | $mol[C]/(m^2[ground]d)$ |
| k | maintenance respiration rate at T = $T_r$ | $mol[C]/(m^2[ground]s)$ |
| p | photosynthesis rate | $mol[C]/(m^2[ground]s)$ |
| $R_m$ | daily maintenance respiration | $mol[C]/(m^2[ground]d)$ |
| $r_g$ | growth respiration rate | $mol[C]/(m^2[ground]s)$ |
| $r_m$ | maintenance respiration rate | $mol[C]/(m^2[ground]s)$ |
| T | temperature | K |
| $T_r$ | reference temperature | K |
| x | molar $CO_2$ concentration | $mol[CO_2]/mol[air]$ |

TABLE 2-continued

| | Notation | |
|---|---|---|
| α | coefficient | mol[CO$_2$]m$^4$[ground]d$^2$/(mol[air]mol$^2$[PAP]) |
| β | coefficient | mol[CO$_2$]m$^2$[ground]d/(mol[air]mol[PAP]) |
| Γ | G/G* | — |
| γ | coefficient | mol[CO$_2$]/mol[air] |
| ε | photosynthetic efficiency | mol[C]/mol[PAP] |
| θ | growth respiration as fraction of growth | — |
| σ | leaf conductance to CO$_2$ | mol[air]/(m$^2$s) |
| τ | time of uniform operation during prescribed period | s/d |

According to Both et al., the following light-CO$_2$ combinations result in the desired daily growth, G*

$$x = \alpha I^2 - \beta I + \gamma \quad 13 \text{ mol}[PAP]/d < I < 17 \text{ mol}[PAP]/d \qquad [42]$$

On the other hand, a common instantaneous photosynthesis rate function is $$g = p - r_g - r_m \qquad [43]$$

$$= p/(1+\theta) - r_m$$

$$= \frac{\varepsilon i \sigma x}{\varepsilon i + \sigma x} - k\exp\{c(T-T_r)\}$$

Assuming constant environmental conditions during a light-period of length τ, namely $$I = i\tau \qquad [44]$$

the daily growth becomes $$G = \left[\frac{\varepsilon i \sigma x}{\varepsilon i + \sigma x} - k\exp\{c(T-T_r)\}\right]\tau \qquad [45]$$

or $$G = \frac{\varepsilon I x}{\frac{\varepsilon}{\sigma\tau}I + x} - k\exp\{c(T-T_r)\}\tau \qquad [46]$$

Assuming now that the daily maintenance respiration rate is constant, independent of I and x, (since daily temperature cycle repeats itself)

$$G = \frac{\varepsilon I x}{\frac{\varepsilon}{\sigma}\frac{I}{\tau} + x} - R_m \qquad [47]$$

and normalizing with respect to the desired daily growth, G*, $$\frac{\frac{\varepsilon}{G^*}I x}{\frac{\varepsilon}{\sigma}\frac{I}{\tau} + x} - \frac{R_m}{G^*} = \frac{G}{G^*} \equiv \Gamma \qquad [48]$$

The result is a three-parameter expression:

$$\frac{A^+ I x}{B^+ \frac{I}{\tau} + x} - C^+ - \Gamma = 0 \qquad [49]$$

Having information (from [42]) only for the case G=G* (namely Γ=1), only two parameters can be fitted.

$$\frac{A^+ I x}{B^+ \frac{I}{\tau} + x} - (C^+ + 1) = 0 \qquad [50]$$

$$\frac{A^+}{1+C^+} I x - B^+ \frac{I}{\tau} - x = 0 \qquad [51]$$

or $$D^+ I x - B^+ \frac{I}{\tau} - x = 0 \qquad [52]$$

Selecting the appropriate values of τ, [I, x] pairs obtained from [42], can be used as data to fit [52]. The fitting requires the minimization of $$\min_{B^+, D^+} \left\{ J = \sum_{I,x,\tau} F^2 \right\} \qquad [53]$$

where $$F\{I, x, \tau\} = D^+ I x - B^+ \frac{I}{\tau} - x \qquad [54]$$

An estimate of $C^+ \equiv R_m/G^*$ must be obtained in some other way. It could probably be set arbitrarily to say 0.1 or even to zero without too much loss of accuracy in the inversion. Once the parameters $A^+$, $B^+$ and $C^+$ are known, the (normalized) growth over any period of time (assuming uniform respiration) can be calculated via

[49]

$$\Delta\Gamma = \int \left(\frac{A^+ i x}{B^+ i + x} - \frac{C^+}{\tau}\right) dt, \qquad [55]$$

where i and x are instantaneous (hourly) values. The value of τ may have to be a guess, perhaps based on the previous 24 hours period. If C is assumed to be zero, [55] reduces to:

$$\overset{[55]}{\Delta\Gamma} = \int \left(\frac{A^+ i x}{B^+ i + x}\right) dt, \qquad [56]$$

From Ferentinos et al. (2000) incorporated by reference above,
  α=2.04e−5 mol[CO$_2$]m$^4$[ground]d$^2$/(mol[air]mol$^2$[PAP])
  β=7.70e−4 mol[CO$_2$]m$^2$[ground]d/(mol[air]mol[PAP])
  γ=7.53e−3 mol[CO$_2$]/mol[air]

Figure 8:
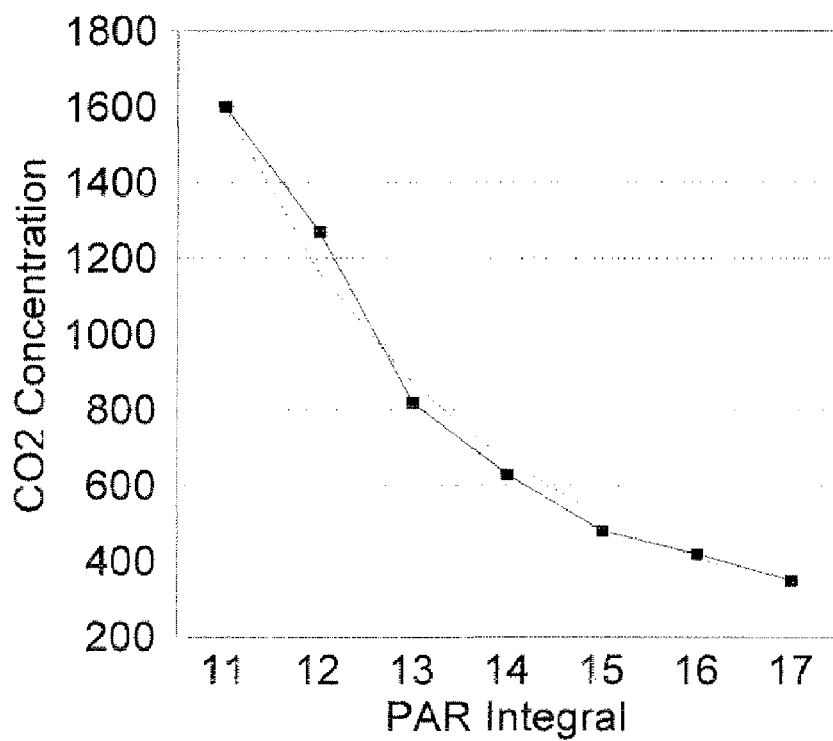
FIG. 8 is an graph of daily PAR integral and $CO_2$ combinations leading to shoot fresh mass of 190 g lettuce, cv. Vivaldi, 35 days after seeding.

A sample fitting resulted in
  $B^+$=0.416 mol[C]s/(mol[PAP]m)
  $D^+$=0.087 m$^2$d/mol[PAP]

and is shown in FIG. 8.

5. Simulated Results

Combinations of the daily PAR integral and $CO_2$ concentration have been established that result in comparable growth rates for a specific cultivar and cultural practice, but the results suggest similar behaviors represent other lettuce cultivars and, perhaps, other species during their vegetative growth phases, albeit with their on unique functions that relate the two factors. Data for *Lacttica sativa*, butterhead lettuce, cv. Vivaldi are shown in FIG. 8. With $CO_2$ concentration and the daily PAR integral expressed in ppm and $mol/m^2$, respectively, the data is represented by the following expression:

$$CO_2 = 2.66E+4 \exp(-0.261 \, PAR) \quad [57]$$

An assumption here is that the plant response time constant in response to $CO_2$ changes is short compared to the one-hour time step of control actions, and there is no adaptation required for plants to adjust when the concentration changes. Parallel gas exchange measurements have shown that lettuce reacts quickly to instantaneous light and $CO_2$ concentrations.

Light intensity and integral projections for each hour time step may be made using the light control algorithm published by Albright, et al. (2000.) The present invention employs a similar algorithm predicated on controlling supplemental lights to reach a temporally consistent light integral target, but utilizes a daily target that can change hourly, depending on the history of the day and the $CO_2$ concentration found to be optimum for the predicted ventilation rate for the next hour. As noted above, the predicted PAR and outdoor air temperature during the near future may be used in a greenhouse energy balance to solve for the expected ventilation rate.

Figure 9:
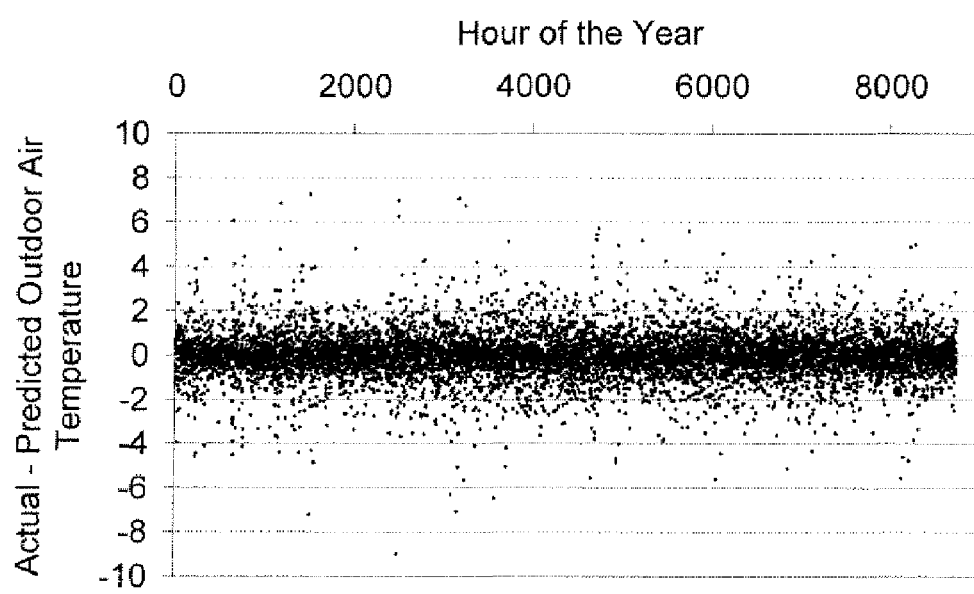
FIG. 9 is a graph of errors in predicting outdoor hourly air temperatures using a second order polynomial based on the current and two previous hourly air temperature readings in accordance with a method of the invention.

Predicting outdoor air temperature one hour ahead of the current hour (the selected time interval) was by extrapolation. If one measures the current and two previous hourly air temperatures, a second order polynomial can be fitted exactly to the three data points and used to extrapolate one time step ahead. A polynomial was used, assuming the temperature trend would continue (the trend and its curvature). This is not always true because sudden temperature changes can occur. In FIG. 9 are shown prediction errors for one year of hourly air temperature data for Ithaca, N.Y., U.S.A. Seventy-seven percent of the predictions were within b 1 C accuracy, 94% within 2 C accuracy, and 98% within 3 C accuracy. It should be noted that errors where outdoor air temperature is less than predicted are acceptable; ventilation will be less than predicted, $CO_2$ loss will be less, and operation will still be close to optimum. Moreover, greenhouse temperature can be permitted to drift up a degree or two and remain within typical greenhouse control accuracy. There may even be a benefit to drifting up a degree or two. More frequent data and regression could, perhaps, provide more accurate temperature predictions.

Figure 10:
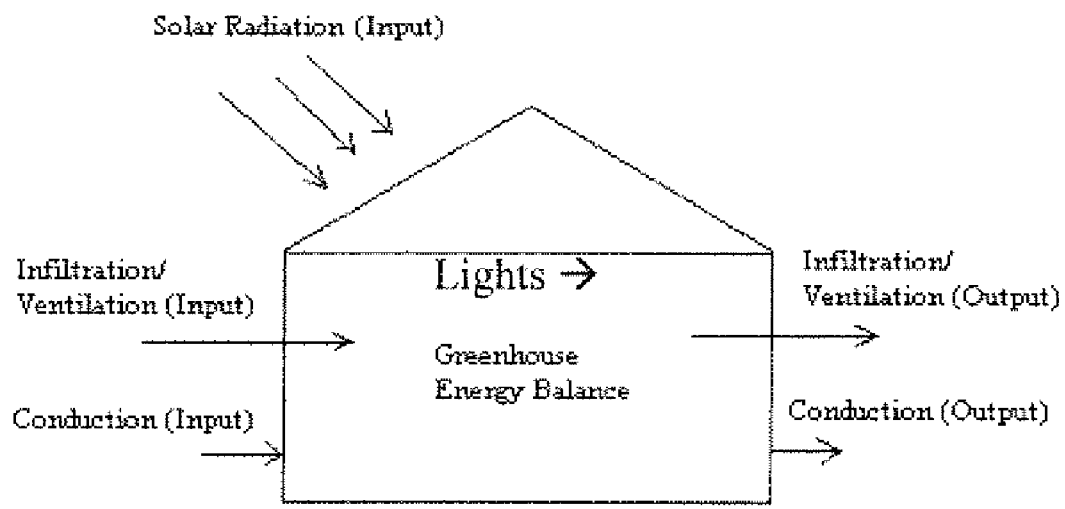
FIG. 10 is an illustration of the elements of a greenhouse thermal model in accordance with the present invention.

With these sub-models, a step-wise, steady state, thermal model of a greenhouse was formulated, based on the sketch in FIG. 10. The model was used to predict the ventilation required for the next hour (with a minimum infiltration rate as a threshold below which ventilation could not go).

The model and sub-models described above were tested by computer simulation (using hourly weather data for one year) and is estimated to save approximately one-half the lighting energy and nearly forty percent of the operating cost of supplementing the two resources, with no loss of plant production potential when lettuce is the crop of interest. A generic greenhouse was assumed for simulation purposes; representative parameters are listed in Table 3. The model was programmed as an application in Java and one year (1988) of hourly weather data from Ithaca, N.Y., USA, was used for calculations.

TABLE 3

Summary of base case simulation parameters

| Parameter | Assumed Value | Units |
|---|---|---|
| Air infiltration | 0.5 | Air changes per hour |
| Transmissivity to sunlight | 0.7 | Dimensionless |
| Greenhouse latitude | 42 North | Degrees |
| Electric rate schedule peak hours | 7 am to 10 pm | Hours |
| On-peak electric rate | 0.088 | US$/kWh |
| Off-peak electric rate | 0.056 | US$/kWh |
| $CO_2$ cost | 0.25 | US$/kg |
| Greenhouse floor area | 743 | $m^2$ |
| Average greenhouse height | 3.7 | m |
| Number of luminaires | 146 | |
| Luminaire wattage, HPS | 680 (includes ballast) | Watts |
| Supplemental PAR level | 180 | $\mu mol \, m^{-2} \, s^{-1}$ |
| Daily PAR integral target | 17 | $mol/m^2$ |
| Greenhouse temp., 6 am to 6 pm | 24 | C |
| Greenhouse temp., 6 pm to 6 am | 18 | C |
| Greenhouse heat loss factor | 8.5 | $W \, m^{-2} \, K^{-1}$ (of floor area) |
| Conversion, suppl. light energy to sensible energy | 0.6 | Dimensionless |
| Conversion, sunlight outdoors to sensible energy indoors | 0.34 | Dimensionless |
| Ambient $CO_2$ concentration | 400 | ppm, or $\mu mol/mol$ |

A base case scenario without $CO_2$ supplemented provided the data in Table 4. Table 5 contains comparable data but with supplemental $CO_2$ enabled. Additional simulations to show the influence of greenhouse light transmissivity and greenhouse air-tightness (averaged air infiltration) were completed and results are in Table 6.

TABLE 4

Results, base case with $CO_2$ not enabled

| Parameter | Value |
|---|---|
| Total cost of lighting | US$18,670 |
| Lighting cost/$m^2$ | US$25.12 |
| Hours of lighting | 2766 |
| $Mol/m^2$ from supplemental lighting | 1792 |

TABLE 5

Results, base case with $CO_2$ enabled

| Parameter | Value |
|---|---|
| Total cost of lighting | US$9630 |
| Lighting cost/m2 | US$12.96 |
| Total CO2 cost | US$1860 |
| CO2 cost/m2 | US$2.50 |
| Total Lighting + CO2 cost | US$11,500 |
| Total Lighting + CO2 cost/m2 | US$15.50 |
| Cost savings compared to base case | US$9.60/m2 (38%) |
| Hours of lighting | 1451 |
| Mol/m2 from supplemental lighting | 940 |

TABLE 6

Simulation results, additional situations, values are yearly and per m² of greenhouse floor area

| Simulation | Lighting hours | Lighting cost | CO₂ cost | Total cost |
|---|---|---|---|---|
| Set greenhouse transmissivity = 0.5 | | | | |
| CO₂ enabled | 2002 | US$18.16 | US$3.02 | US$21.18 |
| CO₂ not enabled | 3623 | US$33.31 | — | US$33.31 |
| Set greenhouse transmissivity = 0.6 | | | | |
| CO₂ enabled | 1673 | US$15.08 | US$2.72 | US$17.80 |
| CO₂ not enabled | 3138 | US$28.67 | — | US$28.67 |
| Set minimum air infiltration = 1.0 h⁻¹ | | | | |
| CO₂ enabled | 1489 | US$13.26 | US$4.36 | US$17.62 |
| CO₂ not enabled | 2766 | US$25.12 | — | US$25.12 |
| Set minimum air infiltration = 1.5 h⁻¹ | | | | |
| CO₂ enabled | 1503 | US$13.36 | US$6.13 | US$19.49 |
| CO₂ not enabled | 2766 | US$25.12 | — | US$25.12 |
| Set minimum air infiltration = 2.0 h⁻¹ | | | | |
| CO₂ enabled | 1514 | US$13.47 | US$7.88 | US$22.35 |
| CO₂ not enabled | 2766 | US$25.12 | — | US$25.12 |

5.1 Simulation Results Discussion

The most obvious result of the simulations is the predicted savings of both energy and operating cost. The base case, with $CO_2$ supplemented and coordinated light control, shows an energy savings of 47% and an operating cost savings of 37%. A lower greenhouse PAR transmittance raises costs. If the greenhouse is less air tight, costs increase significantly—both for heat and $CO_2$, if supplemented. Separate simulations, not shown here, show savings from adding $CO_2$ are real, although diminishing, up to an air exchange rate of approximately 4 h⁻1, depending on values of other factors.

To implement the process of adjusting the daily PAR integral target when $CO_2$ was above ambient, the process was programmed starting with Eq. [57]. Inverting the equation yields $$PAR = 3.83[\ln(2.66E4) - \ln(CO_2)], \quad [58]$$

which can be used to scale the actual PAR received by $$PAR_{virtual} = PAR_{actual}[\ln(2.66E4) - \ln(400)]/[\ln(2.66E4) - \ln(CO_2)], \quad [59]$$

where 400 is assumed to be the ambient $CO_2$ concentration. For example, an hourly PAR integral of 1.5 mol/m² (natural and/or supplemental light) at a $CO_2$ concentration of 1000 ppm corresponds to a virtual PAR integral of 1.92 mol/m² at ambient $CO_2$. The simulation program accumulated daily sums of virtual PAR values and controlled the lights and $CO_2$ to reach the standard target integral using the virtual values (e.g., 17 mol/m² for the base case). This approach was simpler than readjusting the daily PAR integral target every hour.

The majority of hourly $CO_2$ control decisions were to provide lull $CO_2$ (1600 ppm in the simulation) or ambient. However, there were numerous hours between the two extremes. For example, the base case showed 237 out of 1451 hours of supplemental lighting were with an optimum $CO_2$ concentration calculated between the extremes, caused by the calculated required ventilation being somewhat above the air infiltration rate but not large.

Including $CO_2$ concentration decay when supplementation stopped was important in calculating the virtual PAR integrals of the following hours, particularly during daylight hours when natural light always continued. When the air infiltration rate was low, as in the base case, the decay of $CO_2$ to ambient required several hours. As an example, decay from 1600 ppm, with 0.5 h⁻1 air exchange showed calculated $CO_2$ hourly concentrations of, 1128, 841, 668, 562, and 499 ppm (at which point supplementation resumed), which is a long decay curve. These data were for daylight hours when $CO_2$ had been supplemented early but then stopped. Actual (natural) PAR integrals during the decay period were 1.86, 2.38, 1.75, 0.98 and 0.81 mol/m², for a total of 7.78 mol/m². The corresponding virtual hourly PAR integrals were 2.47, 2.89, 1.99, 1.07 and 0.86 mol/m² for a total of 9.28 mol/m², a 19% increase over the actual values. This magnitude of error, if repeated for several days, could lead to noticeable lettuce tip burn problems and potential crop and economic loss.

Figure 11:
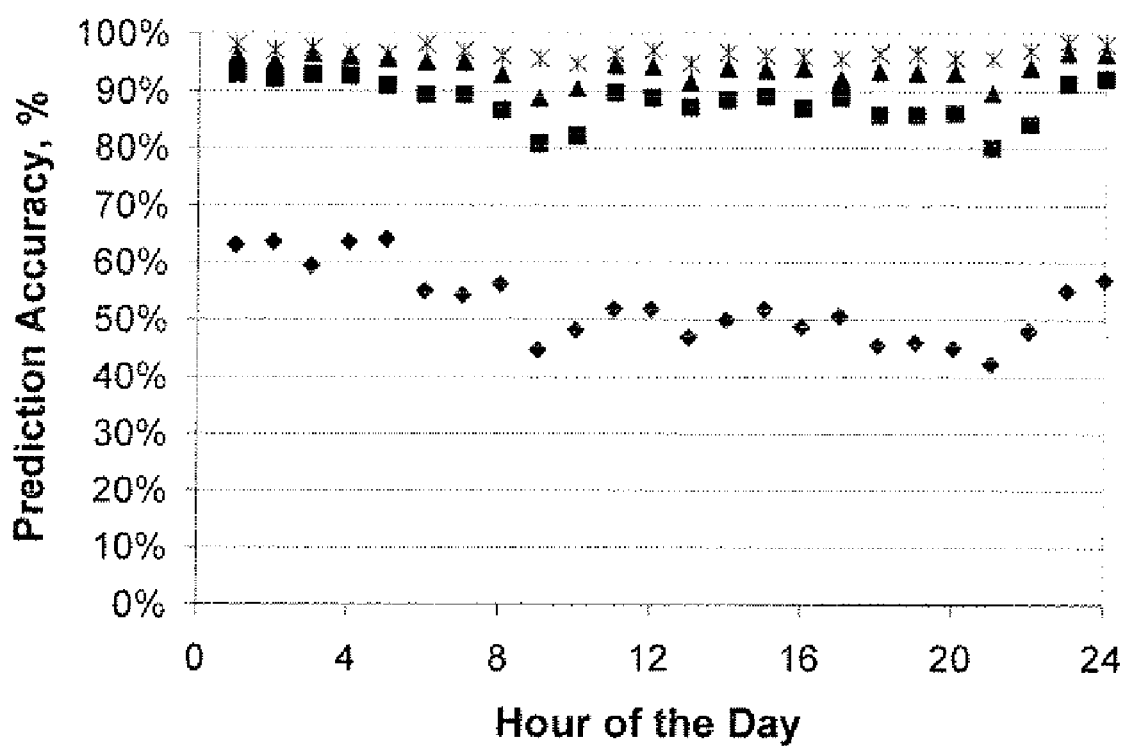
FIG. 11 is a graph of outdoor air temperature prediction accuracy according to a method of the invention as a function of time of day.

The simple extrapolation procedure used to predict the next hour's outdoor air temperature showed slightly better efficacy during night when air temperatures are generally more stable. However, the efficacy was relatively constant during the day. Prediction accuracy for the 1988 weather data simulation is shown in FIG. 11. The outdoor air temperature prediction accuracy is reflected as a function of time of day. Symbols, from bottom to top, represent 0.5, 1.0, 1.5 and 2.0 C errors. The errors are shown (percentages represent how many hours were within each error limit). Accuracy is slightly reduced early in the morning as the air temperature history changes from relatively flat before sunrise, to a sudden jump after sunrise. In such situations, errors were often large positive values for one hour, followed by large negative values the next hour. This is an artifact of the extrapolation procedure. A mirror image effect appears to occur at or slightly after sunset when air temperature can suddenly drop during clear evenings. During the exploration of this extrapolation procedure, a year of air temperature data from New Jersey, USA, was analyzed and prediction accuracy was greater. The New Jersey climate is closer to maritime in nature; the Ithaca climate is more continental.

More sophisticated greenhouse air temperature control could be implemented to improve the simple simulation presented here, without deviating from the scope of the present invention. For example, the program was written to keep greenhouse air temperature at the desired set point by using ventilation. The prediction errors where actual outdoor air temperature was one or two degrees above the predicted value would lead to increased ventilation and $CO_2$ venting. Most greenhouse air temperature control includes a dead band between heating and cooling, with temperature steps of one or two degrees between ventilation/cooling stages. Permitting such temperature drifting would improve the efficacy of the control algorithm.

6. Summary

Previous attempts to optimize combinations of $CO_2$ and supplemental lighting have been inadequate Two reasons for this are (1) ventilation rate is assumed constant throughout the day, and (2) the non-linear response of assimilation to light and $CO_2$ is averaged in the previous systems. The sudden jumps of the solutions for periods $P_2$ and $P_4$ suggest that vertical solution trajectories in these regions are probably good enough.

In view of FIGS. 6 and 7, a simple enrichment strategy usable in some embodiments of the invention may be as follows: If the ventilation rate is higher than 0.005 m³/(m²s), do not enrich. If it is lower, enrich to the maximum permissible concentration (1600 ppm in some embodiments, however no embodiment is limited to any particular maximum permissible concentration).

Systems and methods for optimizing costs associated with resource consumption related to plant production have been disclosed. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

The terminology used in this application is meant to include all of these environments. It is to be understood that the above description is intended to be illustrative, and not restrictive. Many other embodiments will be apparent to those of skill in the art upon reviewing the above description. Therefore, it is manifestly intended that this invention be limited only by the following claims and equivalents thereof.

It is claimed:

1. A method for controlling resources for growing a plant, the method comprising the steps of:
   (a) receiving desired resource amounts for associated resources to achieve a desired plant production rate;
   (b) initializing a time period;
   (c) determining actual resource amounts for each of the associated resources;
   (d) determining costs for each of the associated resources to supplement the actual resource amounts to achieve the desired resource amounts for an upcoming time period;
   (e) selecting one of the associated resources which has the lowest of the costs;
   (f) supplementing the actual resource amount of the selected associated resource with the selected associated resource;
   (g) adding the supplemented resource amount of the selected associated resource to the actual resource amounts of the associated resources, and providing the additive total amount to the plant during the time period;
   (h) predicting an outside air temperature outside of a greenhouse containing the plant for the upcoming time period;
   (i) predicting solar photosynthetic active radiation (PAR) during the upcoming time period; and
   (j) calculating a greenhouse ventilation rate needed for indoor air temperature control of the greenhouse based on the predicted outdoor air temperature and the predicted solar PAR during the upcoming time period and controlling the greenhouse indoor air temperature based on the calculated greenhouse ventilation rate.

2. The method of claim 1, wherein one of the associated resources comprises electricity for a lighting system.

3. The method of claim 1, wherein one of the associated resources comprises carbon dioxide ($CO_2$).

4. The method of claim 1, wherein the time period is selected from the group consisting of a peak period and a non-peak period.

5. The method of claim 1 further comprising the steps of:
   (k1) incrementing the time period; and
   (l1) repeating steps (c)-(k1).

6. The method of claim 1, further comprising the steps of:
   (k2) modifying the desired plant production rate; and
   (l2) repeating steps (b)-(k2).

7. The method of claim 1, further comprising the step of calculating a proportional plant growth achieved.

8. The method of claim 1, wherein one of the associated resources is a naturally available resource.

9. The method of claim 8, wherein the naturally available resource varies in accordance with a natural resource time period.

10. The method of claim 9, wherein the naturally available resource is solar radiation and the natural resource time period is selected from the group consisting of daytime and nighttime.

11. The method of claim 1, wherein one of the associated resources comprises $CO_2$ and is used to supplement $CO_2$ decay losses.

12. The method of claim 1, wherein said step of determining actual resource amounts further comprises predicting for an upcoming time period at least one environmental condition affecting the actual resource amounts selected from the group consisting of solar insolation within the greenhouse, and ventilation rate from the greenhouse encompassing the plant.

13. The method as in claim 1 further comprising the steps of
   predicting solar PAR irradiation for the upcoming time period based on a cumulative actual solar PAR integral; and
   predicting an amount of $CO_2$ that must be added to the greenhouse to achieve the actual resource amounts of the associated resources using pre-selected greenhouse characteristics, the predicted solar PAR irradiation, and the predicted outdoor air temperature, with and without using supplemental PAR irradiation.

14. The method as in claim 13 further comprising the steps of:
   predicting, for a range of the predicted $CO_2$ concentrations and for the time period, a virtual solar PAR integral for the time period based on a selection of the predicted $CO_2$ concentrations within the range, the predicted solar PAR, and the supplemental PAR irradiation.

15. The method as in claim 14 further comprising the steps of:
   adding the virtual solar PAR integral to the cumulative virtual solar PAR integral; and
   tracking the progress of the virtual solar PAR integral towards achieving a pre-selected target total PAR integral.

16. A system for controlling resources for growing a plant comprising:
   a computer including hardware and software functions that:
      receive desired resource amounts for associated resources to achieve a desired plant production rate,
      initialize a time period,
      determine actual resource amounts for each of said associated resources,
      determine costs for each of said associated resources to supplement said actual resource amounts to achieve said desired resource amounts for an upcoming time period,
      select one of said associated resources based on a lowest of said costs, and
      supplement said actual resource amount of said selected associated resource with said lowest of said costs; and
   resource controllers that
      add said supplemented resource amount of said selected associated resource and said actual resource amounts of said associated resources;
      provide the additive total amount to said plant during said time period;
      predict air temperature outside of a greenhouse containing said plant for said upcoming time period;

predict solar photosynthetic active radiation (PAR) during said upcoming time period; and calculate a greenhouse ventilation rate needed for indoor air temperature control of the greenhouse based on the predicted outdoor air temperature and the predicted solar PAR during said upcoming time period and controlling the greenhouse indoor air temperature based on the calculated greenhouse ventilation rate.

17. The system of claim 16 wherein said hardware and software functions further include functionality to increment said time period and repeatedly execute said hardware and software functions.

18. The system of claim 16 wherein said hardware and software functions further include functionality to receive a modification to said plant production rate and re-execute said hardware and software functions.

19. The system of claim 16 wherein one of said associated resources comprises electricity for a lighting system.

20. The system of claim 16 wherein one of said associated resources comprises carbon dioxide ($CO_2$).

* * * * *